(12) United States Patent
Kobayashi et al.

(10) Patent No.: US 8,220,005 B2
(45) Date of Patent: Jul. 10, 2012

(54) APPARATUS, SYSTEM, AND COMPUTER PROGRAM PRODUCT FOR PROCESSING INFORMATION

(75) Inventors: Katsumi Kobayashi, Kanagawa (JP); Akihiro Sugano, Kanagawa (JP); Kenichi Ohhashi, Kanagawa (JP); Tomohiro Sudou, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1009 days.

(21) Appl. No.: 12/186,083

(22) Filed: Aug. 5, 2008

(65) Prior Publication Data

US 2009/0064198 A1    Mar. 5, 2009

(30) Foreign Application Priority Data

Aug. 30, 2007    (JP) ................. 2007-224749

(51) Int. Cl.
*G06F 3/038* (2006.01)
*G06F 13/10* (2006.01)
(52) U.S. Cl. ...................................... 719/327
(58) Field of Classification Search ............. None
See application file for complete search history.

(56) References Cited

U.S. PATENT DOCUMENTS

| 6,714,992 | B1* | 3/2004 | Kanojia et al. | 719/321 |
| 2005/0015534 | A1* | 1/2005 | Wu | 710/306 |
| 2005/0097214 | A1* | 5/2005 | Chen et al. | 709/231 |
| 2005/0146742 | A1* | 7/2005 | Gregory | 358/1.15 |
| 2006/0192804 | A1 | 8/2006 | Nakata et al. | |
| 2006/0274368 | A1* | 12/2006 | Imine | 358/1.15 |

FOREIGN PATENT DOCUMENTS

| CN | 1773456 A | 5/2006 |
| JP | 3071166 | 5/2000 |
| JP | 3212272 | 7/2001 |
| JP | 2002-347308 | 12/2002 |
| JP | 2004-357007 | 12/2004 |
| JP | 2005-11200 | 1/2005 |
| JP | 2005-45386 | 2/2005 |
| JP | 2005-167634 | 6/2005 |
| JP | 2005-303978 | 10/2005 |
| JP | 2006-268845 | 10/2006 |

\* cited by examiner

*Primary Examiner* — Andy Ho
*Assistant Examiner* — Paul M Kim
(74) *Attorney, Agent, or Firm* — Oblon, Spivak, McClelland, Maier & Neustadt, L.L.P.

(57) ABSTRACT

An image processing apparatus includes an input unit that inputs a command, a wireless interface unit that wirelessly exchanges data with an image forming apparatus in a direct manner, a transmission/reception control unit that controls an operation of the wireless interface unit, and a program processing unit that performs an installation process of a program. The transmission/reception control unit causes the wireless interface unit to receive a driver module from the image forming apparatus. The program processing unit performs an installation process of the driver module received by the wireless interface unit.

9 Claims, 25 Drawing Sheets

APPARATUS, SYSTEM, AND COMPUTER PROGRAM PRODUCT FOR PROCESSING INFORMATION

CROSS-REFERENCE TO RELATED APPLICATIONS

The present application claims priority to and incorporates by reference the entire contents of Japanese priority document 2007-224749 filed in Japan on Aug. 30, 2007.

BACKGROUND OF THE INVENTION

1. Field of the Invention

The present invention relates to an image processing apparatus that transmits data to an image forming apparatus, an image processing system including the image processing apparatus and the image forming apparatus, and a computer program product for the image processing system.

2. Description of the Related Art

To transmit data from an image processing apparatus such as a movable computer to an image forming apparatus such as a printer and output the data from the image forming apparatus, it is necessary both to connect the information processing apparatus and the image forming apparatus to each other by wired or wireless communications and to install a driver module for the image forming apparatus in the image processing apparatus. The driver module can be stored in a recording medium readable by the information processing apparatus such as a compact disk-read only memory (CD-ROM). Alternatively, the driver module can be uploaded to a given website, and downloaded from the website to the information processing apparatus via a network.

In some companies, movable computers within the office are connected to an image forming apparatus via a network such as a local area network (LAN). A user can print desired data out from the image forming apparatus by manipulating one of the movable computers. Moreover, in a system disclosed in Japanese Patent Application Laid-open No. 2006-268845, a host device and a peripheral device are connected to each other via a wireless universal serial bus (USB) instead of a cable or a network. To make such system workable, it is necessary for the user to install the driver module for the image forming apparatus or the driver module for the peripheral device in the movable computer or the host device in advance or immediately before the user uses the movable computers or the host device.

For example, a person who is not a member of the company comes to the office for a meeting with his movable computer. His movable computer is not allowed to be connected to the office LAN because of security. As a result, he cannot print required data.

If the driver module for the image forming apparatus is installed in his movable computer, his movable computer can be connected to the image forming apparatus by a wired or wireless USB. This, however, requires a manual process for installing the driver module in his movable computer. Moreover, the recording media stored therein the driver module are required as many as computers from outside, which brings additional workloads for preparing and keeping the recording media. Nevertheless, his computer may not be ready when he wishes to print the desired data out because the manual process takes a while.

SUMMARY OF THE INVENTION

It is an object of the present invention to at least partially solve the problems in the conventional technology.

According to an aspect of the present invention, there is provided an image processing apparatus including an input unit that inputs a command; a wireless interface unit that wirelessly exchanges data with an image forming apparatus in a direct manner; a transmission/reception control unit that controls an operation of the wireless interface unit; and a program processing unit that performs an installation process of a program. The transmission/reception control unit causes the wireless interface unit to receive a driver module from the image forming apparatus. The program processing unit performs an installation process of the driver module received by the wireless interface unit.

Furthermore, according to another aspect of the present invention, there is provided an information processing system in which an image processing apparatus including a first wireless interface unit is wirelessly connected to an image forming apparatus including a second wireless interface unit in a direct manner, the image processing apparatus wirelessly transmits print data to the image forming apparatus, and the image forming apparatus prints an image corresponding to the print data. The image forming apparatus further includes a first transmission/reception control unit that causes the first wireless interface unit to transmit a driver module for the image forming apparatus to the image processing apparatus. The image processing apparatus further includes an input unit that inputs a command, a second transmission/reception control unit that causes the second wireless interface unit to receive the driver module from the image forming apparatus, and a program processing unit that performs an installation process of the driver module received by the second wireless interface unit.

Moreover, according to still another aspect of the present invention, there is provided a computer program product including a computer-usable medium having computer-readable program codes embodied in the medium for controlling an operation of an image forming apparatus that is wirelessly connected to an image processing apparatus including a display unit in a direct manner. The program codes when executed causes a computer to executed transmitting including the image forming apparatus wirelessly transmitting a driver module for the image forming apparatus to the image processing apparatus.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
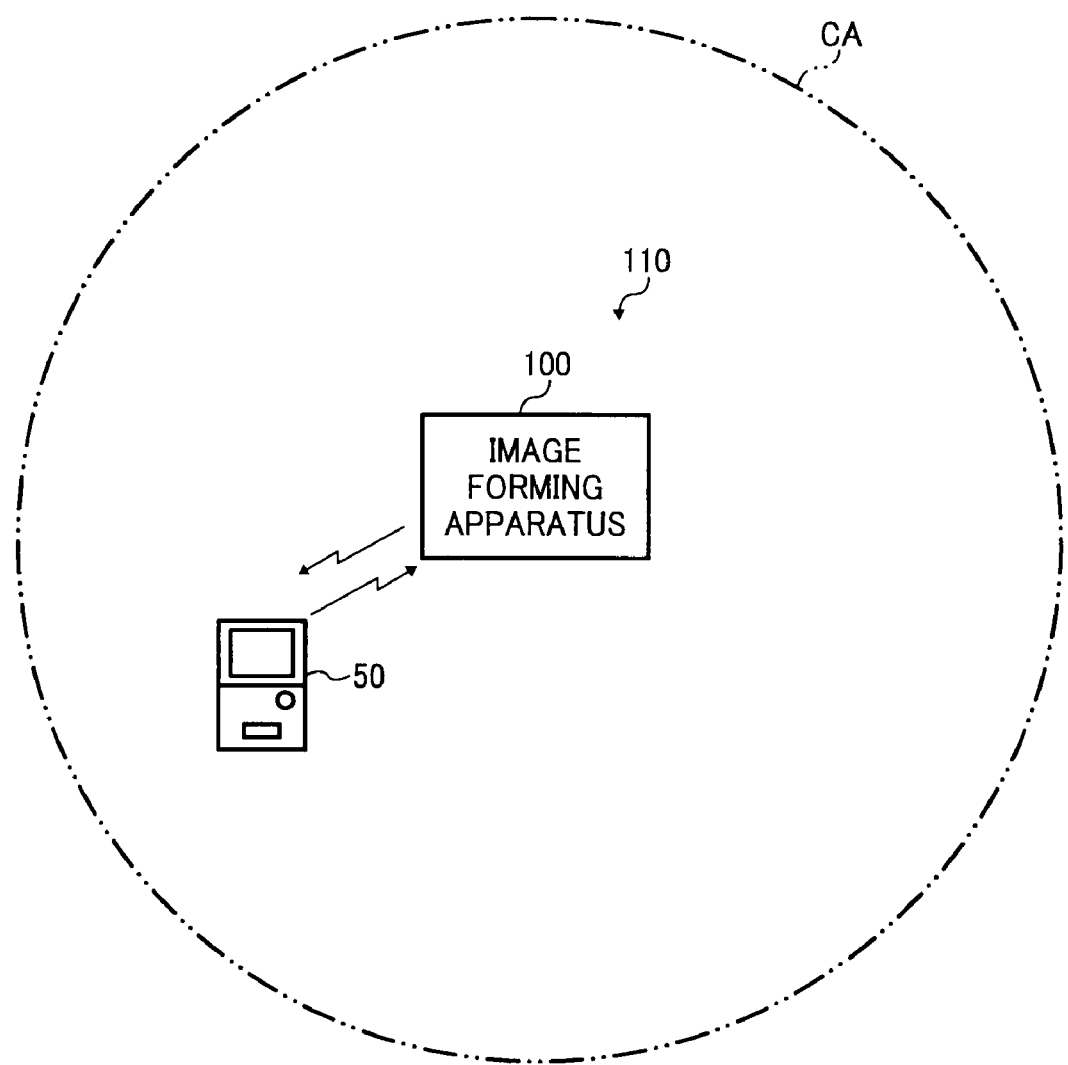
FIG. 1 is a schematic diagram of an information processing system according to a first embodiment of the present invention.

FIG. 1 is a schematic diagram of an information processing system 110 according to a first embodiment of the present invention. The information processing system 110 includes an image processing apparatus 50 and an image forming apparatus 100 that works as an output device, i.e., a printer, of the image processing apparatus 50. The image processing apparatus 50 is, for example, a movable computer. The image forming apparatus 100 is, for example, a printer such as an inkjet printer or an electrophotographic printer. A multifunction product (MFP) having various functions including a facsimile (FAX) function and a copy function can be used as the image forming apparatus 100.

In the information processing system 110, the image processing apparatus 50 and the image forming apparatus 100 are wirelessly connected to each other without any network. Each of the image processing apparatus 50 and the image forming apparatus 100 includes a wireless interface (I/F) such as a wireless USB I/F that performs wireless communications.

However, the image forming apparatus 100 is wirelessly connectable to the image processing apparatus 50 if the image processing apparatus 50 is within a predetermined coverage area (CA). In other words, if the image processing apparatus 50 is outside the CA, the image forming apparatus 100 and the image processing apparatus 50 cannot build the wireless connection between them. The CA is, for example, a circle having a diameter of 10 meters or smaller if the image processing apparatus 50 and the image forming apparatus 100 is wirelessly connected to each other by using their wireless USB I/Fs directly without any network.

The image processing apparatus 50 periodically emits a detection signal to detect a peripheral device wirelessly connectable. Upon receiving the detection signal from the image processing apparatus 50, the image forming apparatus 100 transmits a predetermined acknowledgement signal (ACK signal) to the image processing apparatus 50. When the image forming apparatus 100 transmits the ACK signal in response to the detection signal to the image processing apparatus 50, i.e., when the image processing apparatus 50 enters the CA of the image forming apparatus 100, the image forming apparatus 100 and the image processing apparatus 50 build the wireless connection between themselves through transaction of various signals for identification, authentication, and communications authorization.

After the wireless connection has built, the image forming apparatus 100 wirelessly transmits the driver module to the image processing apparatus 50. Alternatively, the image forming apparatus 100 checks whether the image processing apparatus 50 includes the driver module, and wirelessly transmits, if the image processing apparatus 50 does not include the driver module, the driver module. Upon receiving the driver module, the image processing apparatus 50 installs the received driver module therein.

In this manner, in the information processing system 110, the image processing apparatus 50 receives the driver module for the image forming apparatus 100 from the image forming apparatus 100, and installs the received driver therein. To cause the image processing apparatus 50 to install the driver module therein without fails, the image forming apparatus 100 preferably transmits an install module for installing the driver module attached to the driver module to the image processing apparatus 50.

The image processing apparatus 50 is ready to print desired data out from the image forming apparatus 100 by receiving the driver module and installing the received driver module. In this manner, even if the driver module is not installed in the image processing apparatus 50 when the image processing apparatus 50 enters the CA, the user can print out a desired image from the image forming apparatus 100 by manipulating the image processing apparatus 50 without manually installing the driver module in the image processing apparatus 50.

For example, a person who is not a member of the company comes to the office for a meeting with his movable computer. He wishes to manipulate his movable computer as the image processing apparatus 50 and print desired data out from the image forming apparatus 100 that is connected to a network such as the office LAN. If the information processing system 110 is used, he can print out the data from the image forming apparatus 100 without making his movable computer connected to the network, which increases usability without trading off the security. Moreover, there is no need to prepare the recording media stored therein the driver module and place the recording media near the image forming apparatus 100, which saves the additional workloads for preparing and keeping the recording media. Furthermore, the computer will be ready immediately when he wishes to print the desired data out, compared with the manual operation of reading the driver module from the recording medium and installing the obtained driver module in the image processing apparatus 50.

There can be various types of the image processing apparatus 50 and the image forming apparatus 100 in the information processing system 110. Given below are explanations about the exemplary structure of the image processing apparatus 50 and the image forming apparatus 100 used in the information processing system 110 with reference to FIGS. 2 to 5.

Figure 2:
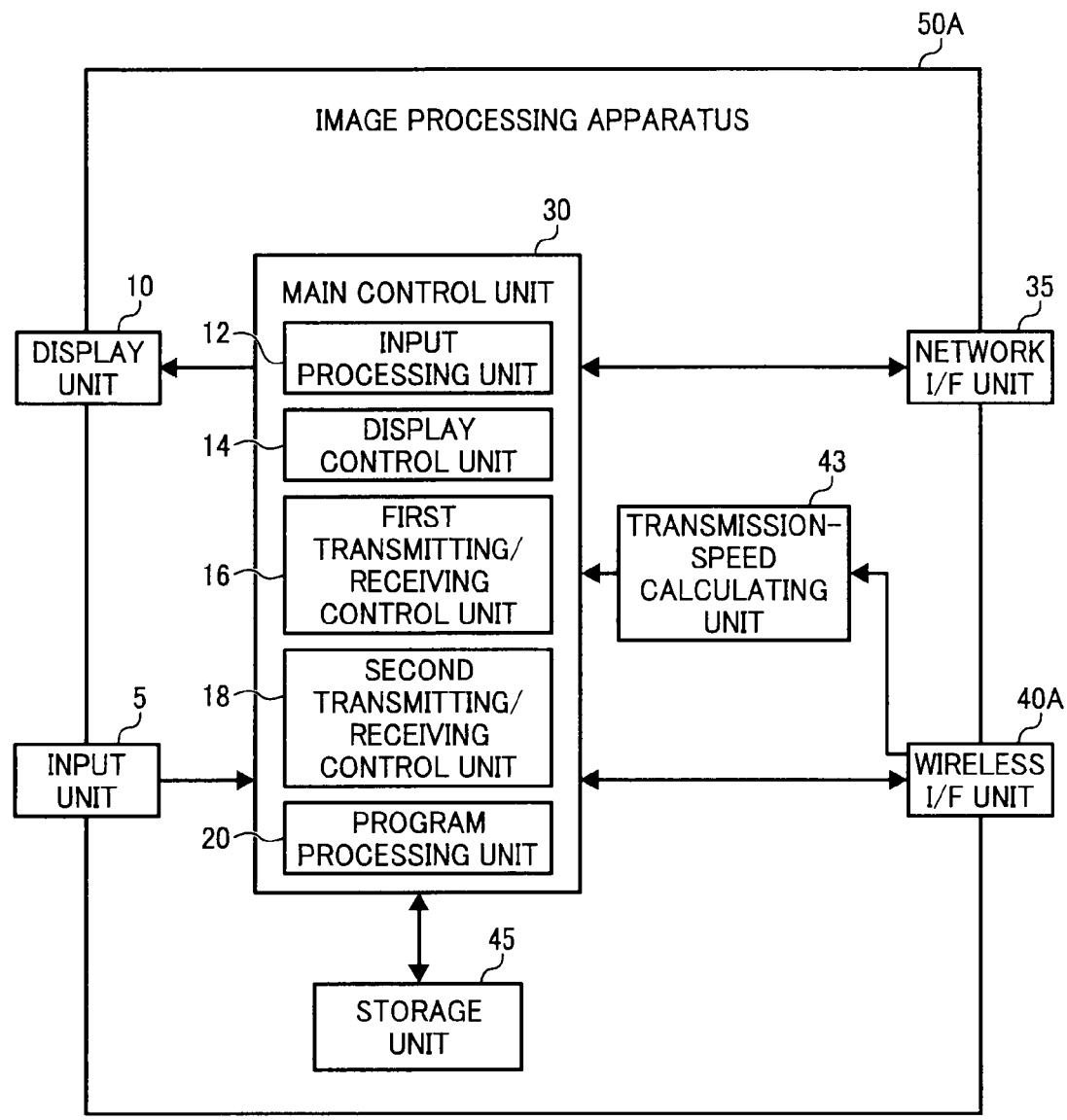
FIG. 2 is a block diagram of an image processing apparatus shown in FIG. 1.

FIG. 2 is a block diagram of an image processing apparatus 50A according to the first embodiment. The image processing apparatus 50A is an example of the image processing apparatus 50. The image processing apparatus 50A includes an input unit 5, a display unit 10, a main control unit 30, a network I/F unit 35, a wireless I/F unit 40A, a transmission-speed calculating unit 43, and a storage unit 45.

The input unit 5 receives commands or data from a user of the image processing apparatus 50A. The display unit 10 displays data received by the image processing apparatus 50A. The main control unit 30 controls operations of the image processing apparatus 50A. The main control unit 30 includes an input processing unit 12, a display control unit 14, a first transmission/reception control unit 16, a second transmission/reception control unit 18, and a program processing unit 20.

The input processing unit 12 performs, if the input unit 5 receives a command, an operation corresponding to the command; and stores, if the input unit 5 receives data, the data in the storage unit 45. The display control unit 14 controls operations of the display unit 10. The first transmission/reception control unit 16 controls operations of the network I/F unit 35. The second transmission/reception control unit 18 controls operations of the wireless I/F unit 40A. The program processing unit 20 performs various processes based on a computer program received from the network via the network I/F unit 35 and a computer program received from an external electric device via the wireless I/F unit 40A, so that the image processing apparatus 50A operates properly.

The network I/F unit 35 transmits/receives commands, data, computer programs, or the like to/from an external electric device via the wired or wireless network such as a LAN or a wide area network (WAN) under control of the first transmission/reception control unit 16. The wireless I/F unit 40A periodically emits the detection signal to detect a peripheral device wirelessly connectable under control of the second transmission/reception control unit 18. Upon receiving the ACK signal in response to the detection signal from a peripheral device, the wireless I/F unit 40A is wirelessly connected to the peripheral device directly without the network, and transmits/receives commands, data, computer programs, or the like to/from the peripheral device under control of the second transmission/reception control unit 18.

The transmission-speed calculating unit 43 calculates the transmission speed of data wirelessly transmitted/received between the wireless I/F unit 40A and the peripheral device. The transmission speed calculated by the transmission-speed calculating unit 43 is displayed on the display unit 10, if required, under control of the display control unit 14. The storage unit 45 stores therein data including a control program for controlling operations of the main control unit 30, a computer program received from the network via the network I/F unit 35, and print data to be wirelessly transmitted to the image forming apparatus via the wireless I/F unit 40A.

Figure 3:
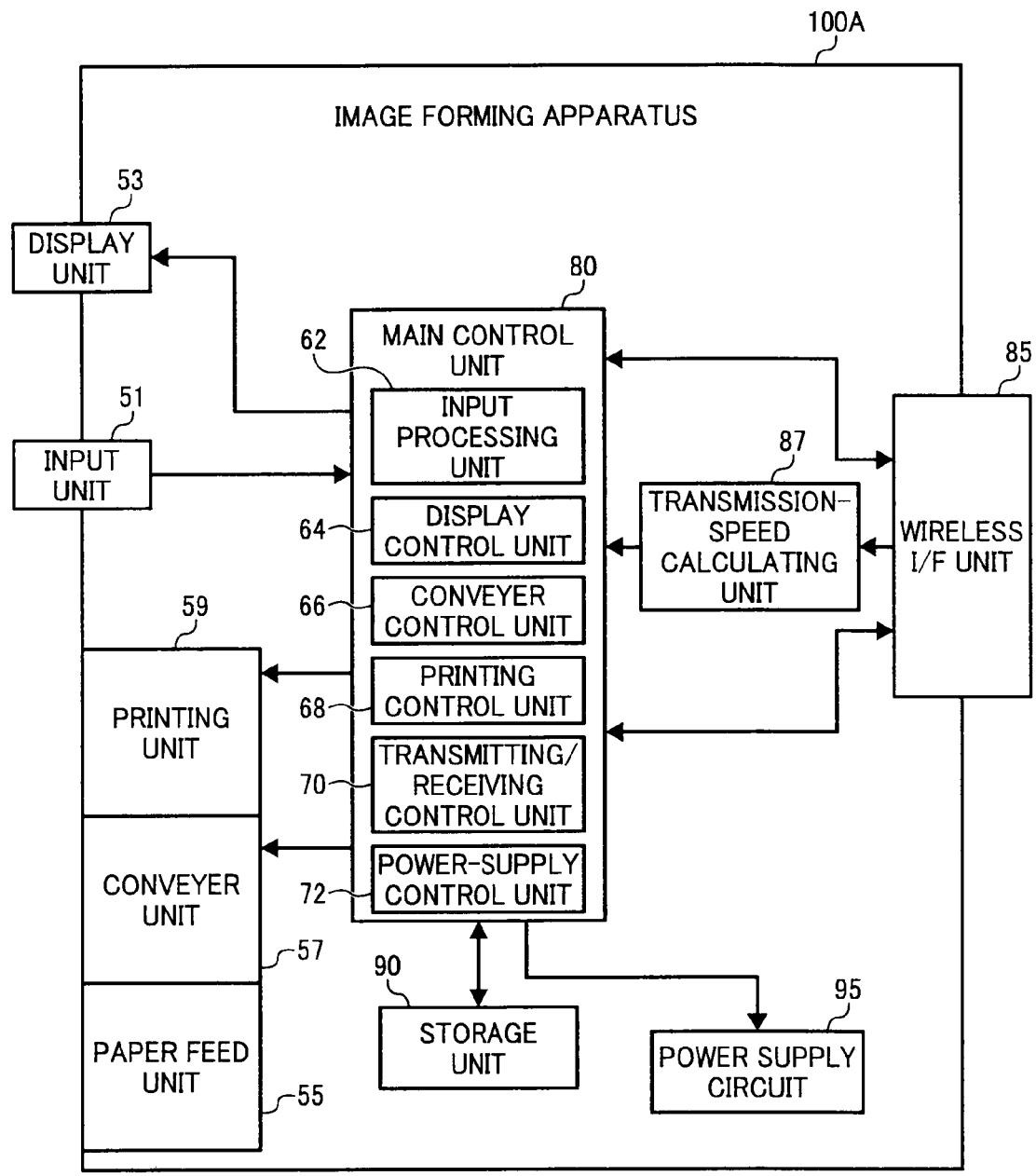
FIG. 3 is a block diagram of an image forming apparatus shown in FIG. 1.

FIG. 3 is a block diagram of an image forming apparatus 100A according to the first embodiment. The image forming apparatus 100A is an example of the image forming apparatus 100, and works as an output device of the image processing apparatus 50A. The image forming apparatus 100A includes an input unit 51, a display unit 53, a paper feed unit 55, a conveyer unit 57, a printing unit 59, a main control unit 80, a wireless I/F unit 85, a transmission-speed calculating unit 87, a storage unit 90, and a power supply circuit 95.

The input unit 51 receives various commands from a user of the image forming apparatus 100A. The display unit 53 displays an instruction screen for instructing a user so that the user can input a desired command to the image forming apparatus 100A, the command received by the image forming apparatus 100A, data representing a state of the image forming apparatus 100A, or the like.

The paper feed unit 55 stores therein recording sheets. The conveyer unit 57 conveys the recording sheets one by one from the paper feed unit 55, and ejects the recording sheets out of the image forming apparatus 100A. The printing unit 59 prints an image onto the recording sheet based on the print data received from the main control unit 80.

The main control unit 80 controls operations of the image forming apparatus 100A. The main control unit 80 includes an input processing unit 62, a display control unit 64, a conveyer control unit 66, a printing control unit 68, a transmission/reception control unit 70, and a power-supply control unit 72.

The input processing unit 62 performs operations corresponding to the command received by the input unit 51. The display control unit 64 controls operations of the display unit 53. The conveyer control unit 66 controls operations of the conveyer unit 57 so that the recording sheet is conveyed from the paper feed unit 55 to the printing unit 59 at proper timing. The printing control unit 68 reads the print data from the storage unit 90, sends the print data to the printing unit 59, and causes the printing unit 59 to print an image corresponding to the print data. The transmission/reception control unit 70 controls operations of the wireless I/F unit 85. The power-supply control unit 72 controls operations of the power supply circuit 95.

Upon receiving the detection signal from the image processing apparatus 50A, the wireless I/F unit 85 transmits the ACK signal under control of the transmission/reception control unit 70. The wireless I/F unit 85 is then, under control of the transmission/reception control unit 70, wirelessly connected to the image processing apparatus 50A directly without the network, and transmits/receives commands or data to/from the image processing apparatus 50A. The transmission-speed calculating unit 87 calculates the transmission speed of data transmitted/received between the image processing apparatus 50A and the image forming apparatus 100A. The storage unit 90 stores therein data including a control program for controlling operations of the main control unit 80, print data received from the image processing apparatus 50A via the wireless I/F unit 85, and the driver module for the image forming apparatus 100A. The power supply circuit 95 generates, under control of the power-supply control unit 72, electric power having a given voltage for operations of the image forming apparatus 100A and outputs the generated electric power via a power-supply line (not shown).

In the information processing system 110 including the image processing apparatus 50A and the image forming apparatus 100A, after the image processing apparatus 50A and the image forming apparatus 100A builds the wireless connection between themselves, the image processing apparatus 50A receives the driver module for the image forming apparatus 100A from the image forming apparatus 100A and installs the received driver module therein. Thus, upon receiving the print data from the image processing apparatus 50A, the image forming apparatus 100A prints out an image corresponding to the print image.

Figure 4:
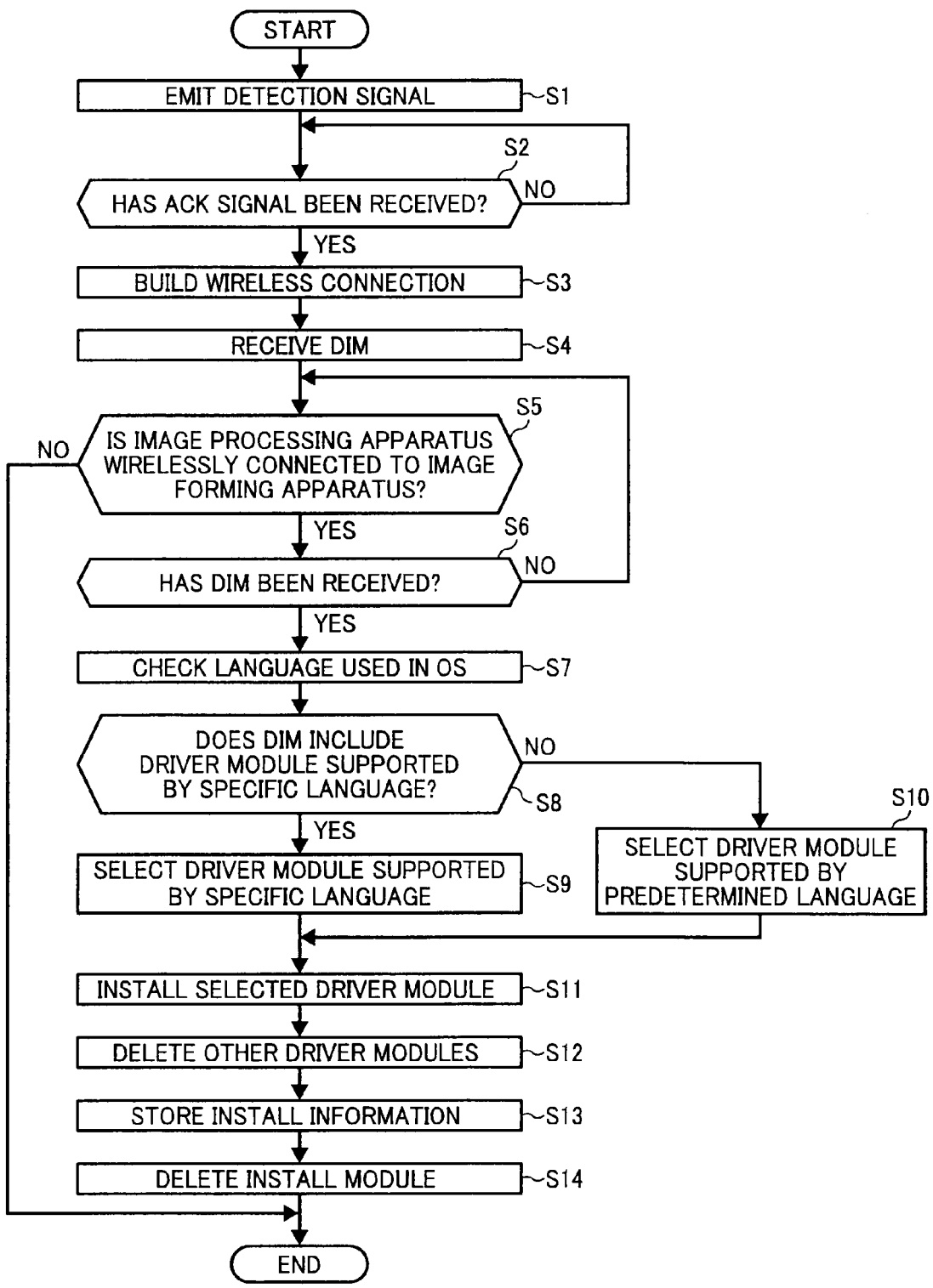
FIG. 4 is a flowchart of an install process according to the first embodiment.

FIG. 4 is a flowchart of an install process according to the first embodiment in which the image processing apparatus 50A receives the driver module for the image forming apparatus 100A from the image forming apparatus 100A. In the install process, the image processing apparatus 50A receives a driver install module (DIM) from the image forming apparatus 100A by executing the control program stored in the storage unit 45 in Steps S1 to S6. After that, the image processing apparatus 50A installs the driver module therein by executing an install module in the DIM in Steps S7 to S14. Each of the steps of the install process is described in detail below.

The wireless I/F unit 40A, for example, periodically emits the detection signal under control of the second transmission/reception control unit 18 (Step S1). The detection signal is used to detect a peripheral device connectable wirelessly. Upon receiving the detection signal, the peripheral device transmits the ACK signal to the image processing apparatus 50A. The second transmission/reception control unit 18 determines whether the ACK signal has been received via the wireless I/F unit 40A (Step S2). If the ACK signal has not been received, i.e., the image processing apparatus 50A is outside the CA of the image forming apparatus 100A (No at Step S2), Step 2 is repeated.

On the other hand, the ACK signal has been received, i.e., the image forming apparatus 100A detects the image processing apparatus 50A that is inside the CA (Yes at Step S2), the wireless I/F unit 40A performs wireless communications with the image forming apparatus 100A under control of the second transmission/reception control unit 18, thereby the wireless connection between the image processing apparatus 50A and the image forming apparatus 100A is built (Step S3). When the wireless connection is built, the image forming apparatus 100A copies the DIM stored in the storage unit 90, and transmits the copied DIM to the image processing apparatus 50A via the wireless I/F unit 85 as described below. The DIM includes the driver module for the image forming apparatus 100A and the install module for installing the driver module.

The image processing apparatus 50A starts receiving the DIM from the image forming apparatus 100A (Step S4). More particularly, the wireless I/F unit 40A receives the DIM under control of the second transmission/reception control unit 18. While receiving the DIM, the second transmission/reception control unit 18 monitors operations of the transmission/reception control unit 70, and determines whether the image processing apparatus 50A is wirelessly connected to the image forming apparatus 100A (Step S5). If the image processing apparatus 50A is not wirelessly connected to the image forming apparatus 100A (No at Step S5), the process control goes to end. If the image processing apparatus 50A is wirelessly connected to the image forming apparatus 100A (Yes at Step S5), the second transmission/reception control unit 18 determines whether the DIM has been received (Step S6). If the DIM has not been received (No at Step S6), Step S5 is repeated. If the DIM has been received (Yes at Step S6), the process control goes to Step S7. The driver module, which is a part of the DIM, has also been received when the DIM has been received. The received DIM is stored in the storage unit 45 by the second transmission/reception control unit 18.

When the DIM has been received (Yes at Step S6), the program processing unit 20 performs Steps S7 to S14 by executing the install module in the DIM. The program processing unit 20 checks a language used in an operating system (OS) of the image processing apparatus 50A (Step S7). The program processing unit 20 determines whether the DIM includes the driver module supported by the language specified at Step S7 (Step S8). If the DIM includes the driver module supported by the specific language (Yes at Step S8), the program processing unit 20 selects the driver module supported by the specific language (Step S9). If the DIM does not include the driver module supported by the specific language (No at Step S8), the program processing unit 20 selects the driver module supported by a predetermined language (Step S10). The language by which the driver module selected at Step S10 is supported can be a universal language or a local language used in areas where the image forming apparatus 100A is expected to be exported.

The program processing unit 20 installs the driver module selected at either Step S9 or Step S10 in, for example, the storage unit 45 (Step S11). The program processing unit 20 deletes driver modules other than the selected driver module (Step S12), and stores install information indicative where the driver module is installed in the image processing apparatus 50A in the storage unit 45 (Step S13). After the install information is stored, the install module deletes itself (Step S14), and the process control goes to end.

Figure 5:
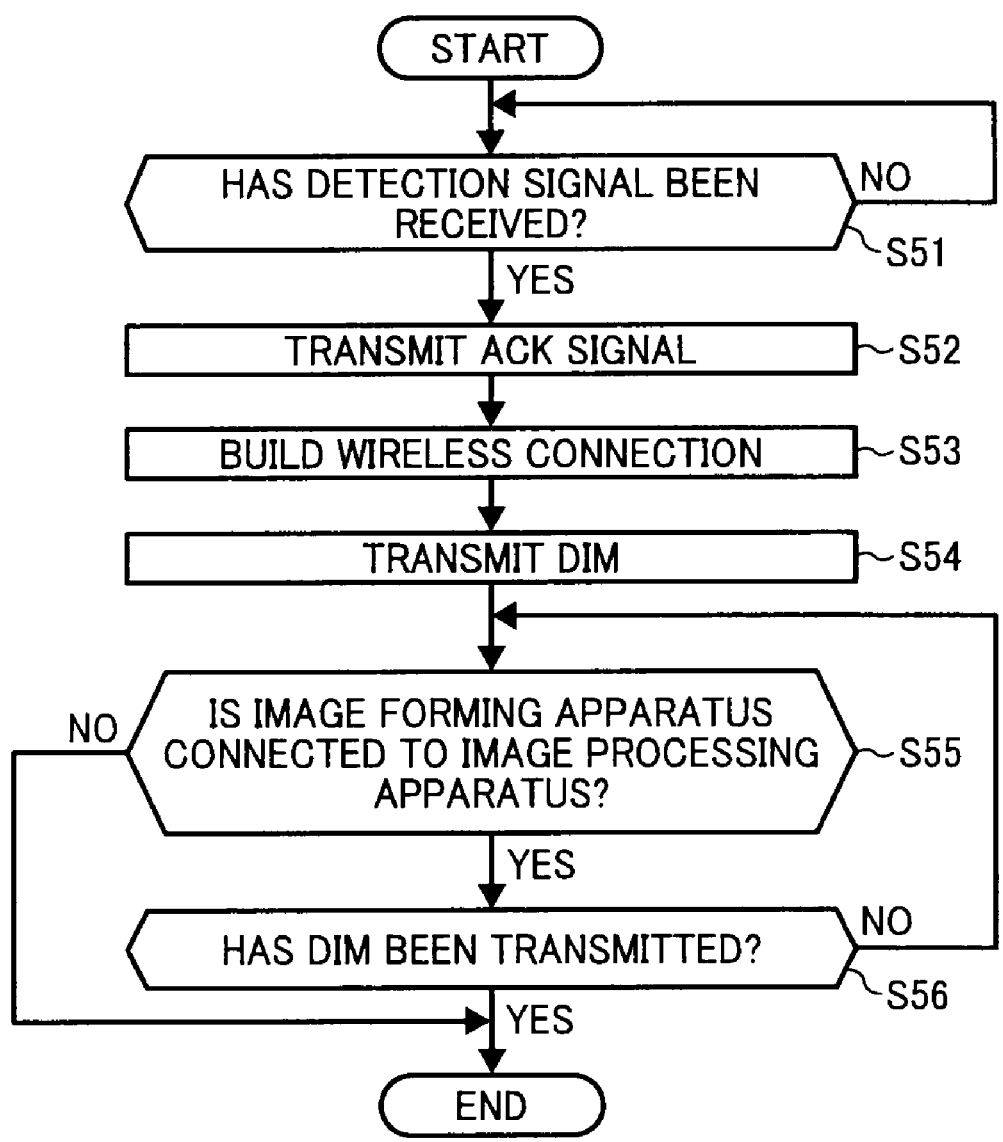
FIG. 5 is a flowchart of a transmitting process according to the first embodiment.

FIG. 5 is a flowchart of a transmitting process according to the first embodiment in which the image forming apparatus 100A wirelessly transmits the driver module to the image processing apparatus 50A. In the transmitting process, the image forming apparatus 100A wirelessly transmits the driver module to the image processing apparatus 50A by executing the control program stored in the storage unit 90 in Steps S51 to S56. Each of the steps of the transmitting process is described in detail below.

The transmission/reception control unit 70 determines whether the detection signal has been received from the image processing apparatus 50A via the wireless I/F unit 85 (Step S51). If the detection signal has not been received (No at Step S51), Step S51 is repeated. If the detection signal has been received (Yes at Step S51), the process control goes to Step S52. The image processing apparatus 50A emits the detection signal continuously, for example, periodically with regardless whether the image forming apparatus 100A is in the CA.

The wireless I/F unit 85 transmits the ACK signal in response to the detection signal to the image processing apparatus 50A under control of the transmission/reception control unit 70 (Step S52). The image forming apparatus 100A transmits the ACK signal each time receiving the detection signal. The wireless connection between the image forming apparatus 100A and the image processing apparatus 50A from which the detection signal is received is built through wireless communications via the wireless I/F unit 85 (Step S53). The operations of the wireless I/F unit 85 are controlled by the transmission/reception control unit 70.

The transmission/reception control unit 70 copies the DIM stored in the storage unit 90, and sends it to the wireless I/F unit 85. The wireless I/F unit 85 wirelessly transmits the copied DIM to the image processing apparatus 50A under control of the transmission/reception control unit 70 (Step S54). While transmitting the DIM, the transmission/reception control unit 70 monitors operations of the wireless I/F unit 85, and determines whether the image forming apparatus 100A is wirelessly connected to the image processing apparatus 50A (Step S55). If the image forming apparatus 100A is not wirelessly connected to the image processing apparatus 50A (No at Step S55), the process control goes to end. If the image forming apparatus 100A is wirelessly connected to the image processing apparatus 50A (Yes at Step S55), the transmission/reception control unit 70 determines whether the DIM has been transmitted (Step S56). If the DIM has not been transmitted (No at Step S56), Step S55 is repeated. If the DIM has been transmitted (Yes at Step S56), the process control goes to end.

In pursuit of higher usability of the information processing system 110, it is preferable to add a display function of displaying a progress or a state of the wireless connection on the display unit to the image processing apparatus 50 or 50A and the image forming apparatus 100 or 100A.

The display function, if added to the image processing apparatus 50A, is useful for the user to connect the image processing apparatus 50A to an image forming apparatus that the user wish to use. Moreover, the user will wait without feeling anxious by checking the progress of the wireless connection. The display function, if added to the image forming apparatus 100A, brings the similar technical effects.

Figure 6:
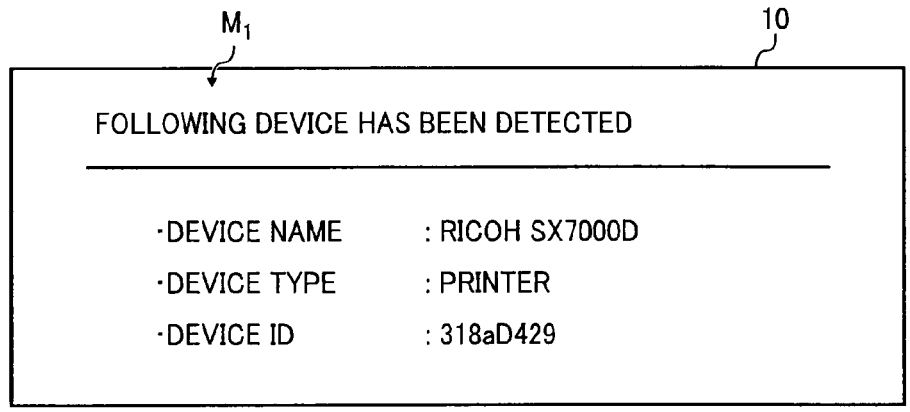
FIG. 6 is a schematic diagram of a message displayed on a display unit shown in FIG. 2.

FIG. 6 is a schematic diagram of a message $M_1$ displayed on the display unit 10 of the image processing apparatus 50A. The message $M_1$ is an exemplary message representing a progress of the wireless connection, and is displayed on the display unit 10 to inform the progress of the wireless connection of the user when the ACK signal is received at Step S2 shown in FIG. 4. More particularly, for example, when the wireless I/F unit 40A of the image processing apparatus 50A receives the ACK signal, the second transmission/reception control unit 18 sends a predetermined signal to the display control unit 14. Upon receiving the signal, the display control unit 14 displays the message $M_1$ on the display unit 10. The message $M_1$ includes device information of the image forming apparatus 100A from which the ACK signal is received. The transmission/reception control unit 70 of the image forming apparatus 100A reads the device information from the storage unit 90 and transmits the obtained device information attached to the ACK signal. The device information is stored in the storage unit 90 by, for example, a manufacture of the image forming apparatus 100A and includes name (model name) of the device, type of the device, identification information (ID) of the device, and specifications of the device.

Figure 7:
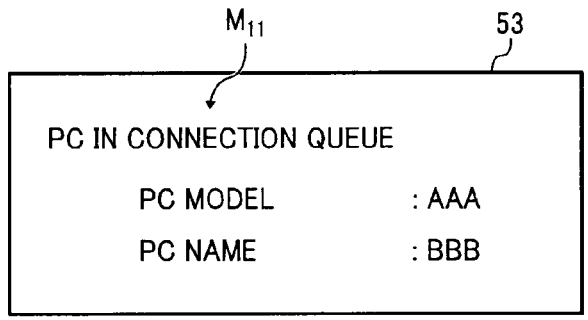
FIG. 7 is a schematic diagram of a message displayed on a display unit shown in FIG. 3.

FIG. 7 is a schematic diagram of a message $M_{11}$ displayed on the display unit 53 of the image forming apparatus 100A. The message $M_{11}$ is an exemplary message representing the progress of the wireless connection and is displayed on the display unit 53 to inform the progress of the wireless connection of the user when the detection signal is received at Step S51 shown in FIG. 5. More particularly, for example, when the wireless I/F unit 85 of the image forming apparatus 100A receives the detection signal, the transmission/reception control unit 70 sends a predetermined signal to the display control unit 64. Upon receiving the signal, the display control unit 64 displays the message $M_{11}$ on the display unit 53. The message $M_{11}$ includes device information of the image processing apparatus 50A from which the detection signal is received. The image processing apparatus 50A transmits the device information attached to, for example, the detection signal.

In pursuit of higher usability of the information processing system 110, it is preferable to add a logging function to at least the image forming apparatus 100 or 100A. The logging function, if added to the image forming apparatus 100 or 100A, is helpful for the user to investigate causes of a failure that may occur in the information processing system 110 and to take anti-failure actions.

Figure 8:
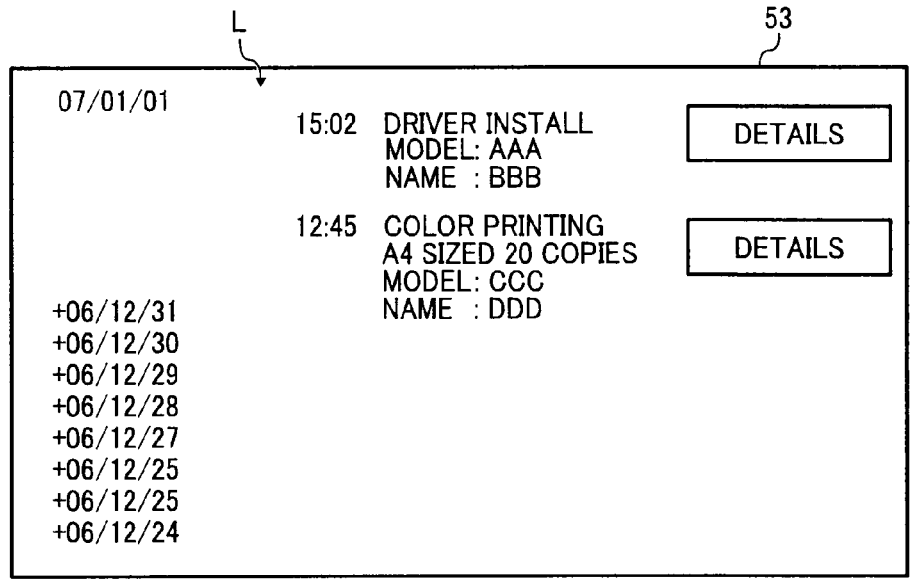
FIG. 8 is a schematic diagram of log data displayed on the display unit shown in FIG. 3.

FIG. 8 is a schematic diagram of log data L displayed on the display unit 53 if the image forming apparatus 100A has the logging function. The log data L is an example and includes log data about a device to which the DIM is transmitted from the image forming apparatus 100A and log data about print data. For example, the transmission/reception control unit 70 stores the device information of the image processing apparatus to which the DIM is transmitted in the storage unit 90 for a predetermined period. The printing control unit 68 stores the device information of the image processing apparatus from which the print data is received wirelessly and information about the print operation including specifications and number of copies in the storage unit 90 for a predetermined period. When the input unit 51 receives a logging command, the input processing unit 62 sends a predetermined command to the display control unit 64. Upon receiving the command, the display control unit 64 reads above information from the storage unit 90, and displays the above information on the display unit 53.

In an information processing system according to a second embodiment of the present invention, an image forming apparatus wirelessly transmits the driver module and an uninstall module for uninstalling the drive module to an image processing apparatus. Upon receiving the driver module and the uninstall module, the image processing apparatus installs therein the driver module. After that, the image processing apparatus uninstalls the driver module at predetermined timing by executing the uninstall module.

The image processing apparatus according to the second embodiment has the same structure as the image processing apparatus 50A; the image forming apparatus according to the second embodiment has the same structure as the image forming apparatus 100A except that the storage unit 90 prestores therein the driver module and the uninstall module. When the wireless connection between the image processing apparatus 50A and the image forming apparatus 100A is built, the transmission/reception control unit 70 copies the driver module and the uninstall module stored in the storage unit 90, and wirelessly transmits the driver module and the uninstall module to the image processing apparatus 50A via the wireless I/F unit 85.

Figure 9:
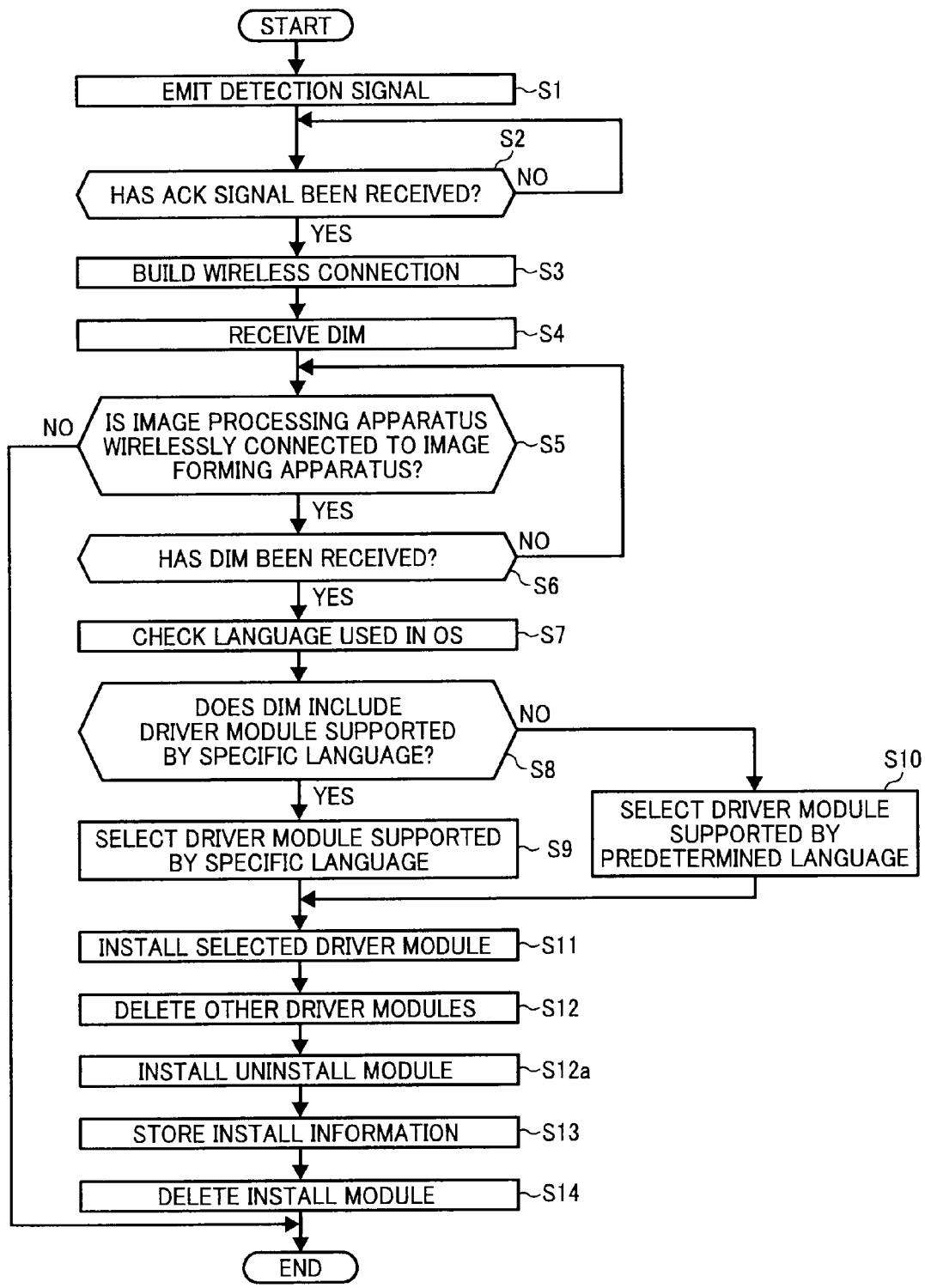
FIG. 9 is a flowchart of an install process according to a second embodiment of the present invention.

FIG. 9 is a flowchart of an install process according to the second embodiment in which the image processing apparatus 50A receives from the image forming apparatus 100A the driver module for the image forming apparatus 100A and the uninstall module for uninstalling the driver module. In the install process, the image processing apparatus 50A receives the DIM from the image forming apparatus 100A by executing the control program stored in the storage unit 45 in Steps S1 to S6. After that, the image processing apparatus 50A installs the driver module and the uninstall module therein by executing an install module in the DIM in Steps S7 to S12, S12a, S13, and S14. The DIM according to the second embodiment includes the uninstall module in addition to the driver module and the install module that are included in the DIM according to the first embodiment.

Steps corresponding to those shown in FIG. 4 are denoted with the same reference numerals. The explanation about steps except Step S12a is not repeated because those steps have been explained with reference to FIG. 4. Install information according to the second embodiment that is stored in, for example, the storage unit 45 at Step S13 includes information indicative where the uninstall module is installed in the image processing apparatus 50A.

The program processing unit 20 selects the uninstall module supported by the same language as the driver module that is selected at either Step S9 or S10, and installs the selected uninstall module by executing the install module (Step S12a).

After the image processing apparatus 50A installs therein both the driver module and the uninstall module for the image forming apparatus 100A in the above manner, the image processing apparatus 50A uninstalls the driver module at predetermined timing by executing a predetermined uninstall program in the uninstall module. The uninstall program can be configured, for example, to automatically run when a predetermined time has passed since the wireless connection between the image processing apparatus 50A and the image forming apparatus 100A is cut off. Alternatively, when a predetermined time has passed since the image processing apparatus 50A lost the image forming apparatus 100A, the image processing apparatus 50A asks the user whether the driver module is to be uninstalled with a confirmation message displayed on the display unit 10. Upon receiving a command to uninstall the driver module from the user, the image processing apparatus 50A uninstalls the driver module.

Figure 10:
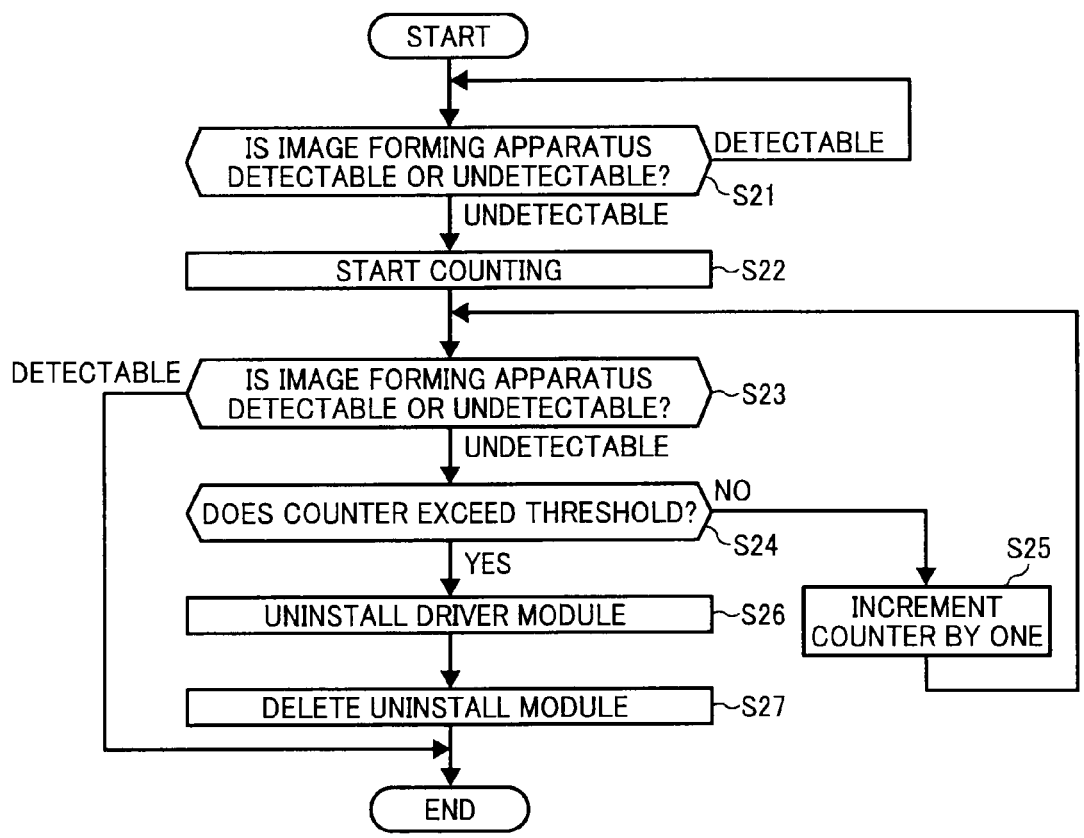
FIG. 10 is a flowchart of an uninstall process according to the second embodiment.

FIG. 10 is a flowchart of an uninstall process according to the second embodiment. In the uninstall process, the image processing apparatus 50A uninstalls the driver module by executing the uninstall program in the uninstall module in Steps S21 to S27.

The second transmission/reception control unit 18 determines whether the image forming apparatus 100A is undetectable by the image processing apparatus 50A (Step S21). If the image processing apparatus 50A is in position to receive the ACK signal from the image forming apparatus 100A, the image forming apparatus 100A is determined to be detectable by the image processing apparatus 50A. If the image processing apparatus 50A is in position not to receive the ACK signal from the image forming apparatus 100A, the image forming apparatus 100A is determined to be undetectable by the image processing apparatus 50A.

If the image forming apparatus 100A is detectable (Detectable at Step S21), Step S21 is repeated. If the image forming apparatus 100A is undetectable (Undetectable at Step S21), the program processing unit 20 starts counting with a counter (Step S22). The program processing unit 20 can use, for example, a clock pulse that is originally used for synchronization in the main control unit 30 as the counter.

After the program processing unit 20 starts counting, the second transmission/reception control unit 18 determines whether the image forming apparatus 100A is detectable (Step S23). If the image forming apparatus 100A is determined to be detectable (Detectable at Step S23), the process control goes to end. If the image forming apparatus 100A is determined to be undetectable (Undetectable at Step S23), the program processing unit 20 determines whether the counter exceeds a threshold (Step S24). The threshold is, for example, decided by the manufacture of the image forming apparatus 100A and pre-stored in the uninstall module.

If the counter does not exceed the threshold (No at Step S24), the program processing unit 20 increments the counter by one (Step S25) and Step S23 is repeated. If the counter exceeds the threshold (Yes at Step S24), the program processing unit 20 uninstalls the driver module from the image processing apparatus 50A (Step S26). When the driver module is uninstalled, the uninstall module deletes itself (Step S27), and the process control goes to end. If the image forming apparatus 100A is determined to be detectable at Step S23, Step S21 and the succeeding steps are repeated with, for example, a predetermined cycle.

In the information processing system including the image processing apparatus designed to have such configuration, the unnecessary driver module is not left stored in the storage unit of the image processing apparatus.

Figure 11:
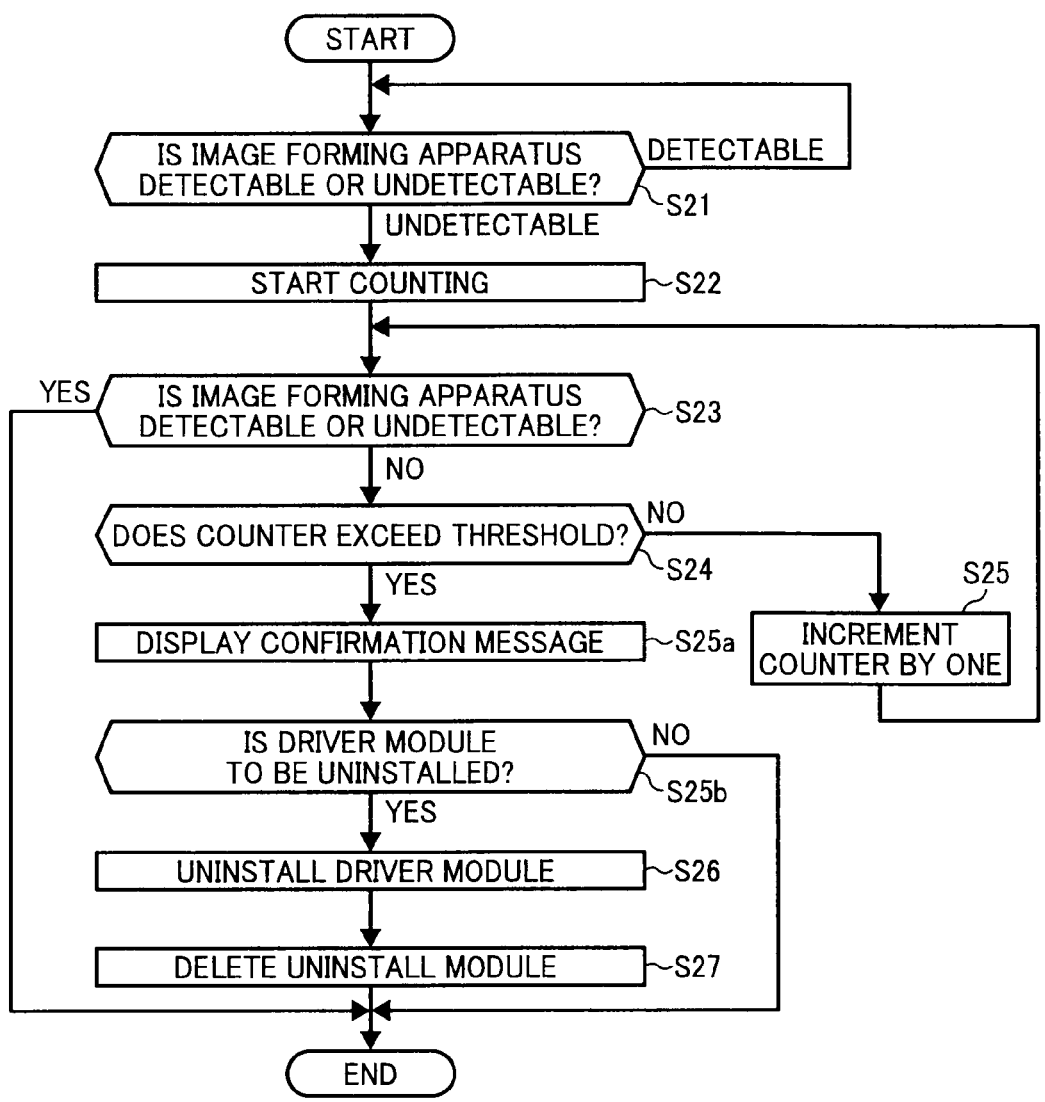
FIG. 11 is a flowchart of another uninstall process according to the second embodiment.

FIG. 11 is a flowchart of another uninstall process according to the second embodiment. In the uninstall process, the image processing apparatus 50A uninstalls the driver module by executing the uninstall program in the uninstall module in Steps S21 to S27, S25a, and S25b. Steps corresponding to those shown in FIG. 10 are denoted with the same reference numerals. The explanation about the steps except Steps S25a and S25b is not repeated because those steps have been explained with reference to FIG. 10.

Figure 12:
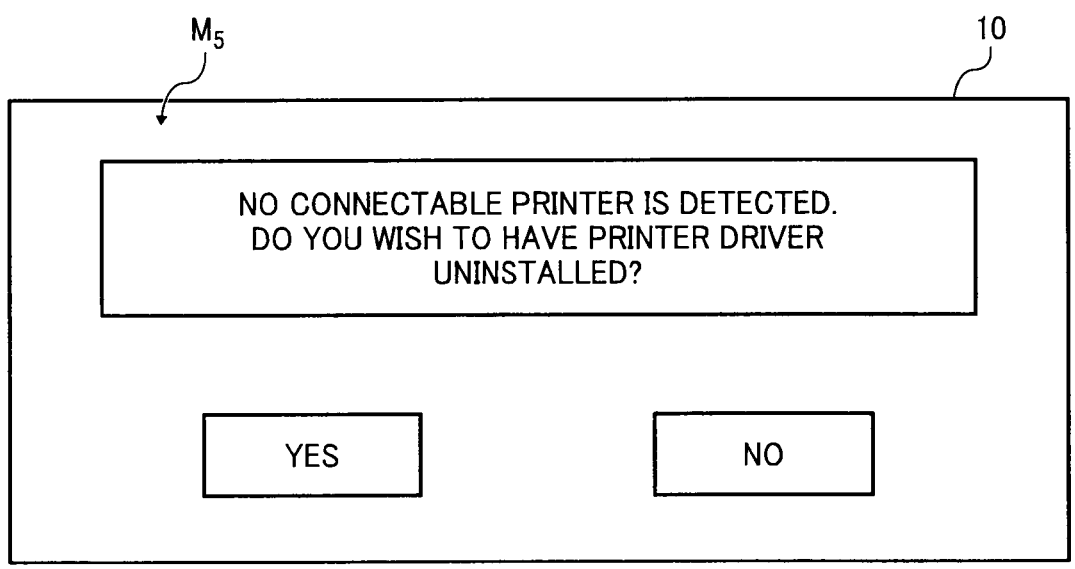
FIG. 12 is a schematic diagram of a confirmation message displayed in the uninstall process shown in FIG. 11.

The program processing unit 20 sends a predetermined signal to the display control unit 14. Upon receiving the signal, the display control unit 14 reads predetermined image data from the storage unit 45, and displays a confirmation message on the display unit 10 (Step S25a). FIG. 12 is a schematic diagram of a message $M_5$ as an example of the confirmation message. The image processing apparatus 50A asks at Step S25a the user whether the driver module (printer driver) is to be uninstalled with the message $M_5$ displayed on the display unit 10.

The program processing unit 20 determines whether the user issues a command to uninstall the driver module as a reply to the confirmation message displayed at Step S25a on the display unit 10 (Step S25b). When the input unit 5 receives the command as a reply to the confirmation message, a signal corresponding to the received command is sent to the input processing unit 12. The input processing unit 12 sends a signal indicative whether the driver module is to be uninstalled to the program processing unit 20.

Upon receiving the signal from the input processing unit 12, the program processing unit 20 determines based on the received signal whether the user issues the command to uninstall the driver module. If the user issues the command not to uninstall the driver module (No at Step S25b), the process control goes to end. If the user issues the command to uninstall the driver module (Yes at Step S25b), the program processing unit 20 uninstalls the driver module (Step S26). In this manner, it is possible to prevent the driver module from being uninstalled at timing the user does not wish.

The process control can be configured to go, if the image forming apparatus 100A is determined to be undetectable at Step S21, to Step S25a skipping Steps S22 to S24 and S25.

In this manner, it is possible to prevent the driver module that is expected to be used from being uninstalled from the image processing apparatus.

The number of image forming apparatuses used in the information processing system is not limited to one, and a plurality of image forming apparatuses can be used. An image processing apparatus according to a third embodiment of the present invention has a function of selecting, if a plurality of image forming apparatuses is detected at the same time, at least one of the image forming apparatuses and building the wireless connection between the selected image forming apparatus and itself. Such an image processing apparatus can be configured to automatically select the target image processing apparatus to be connected, or select the target image processing apparatus based on a command from the user.

Figure 13:
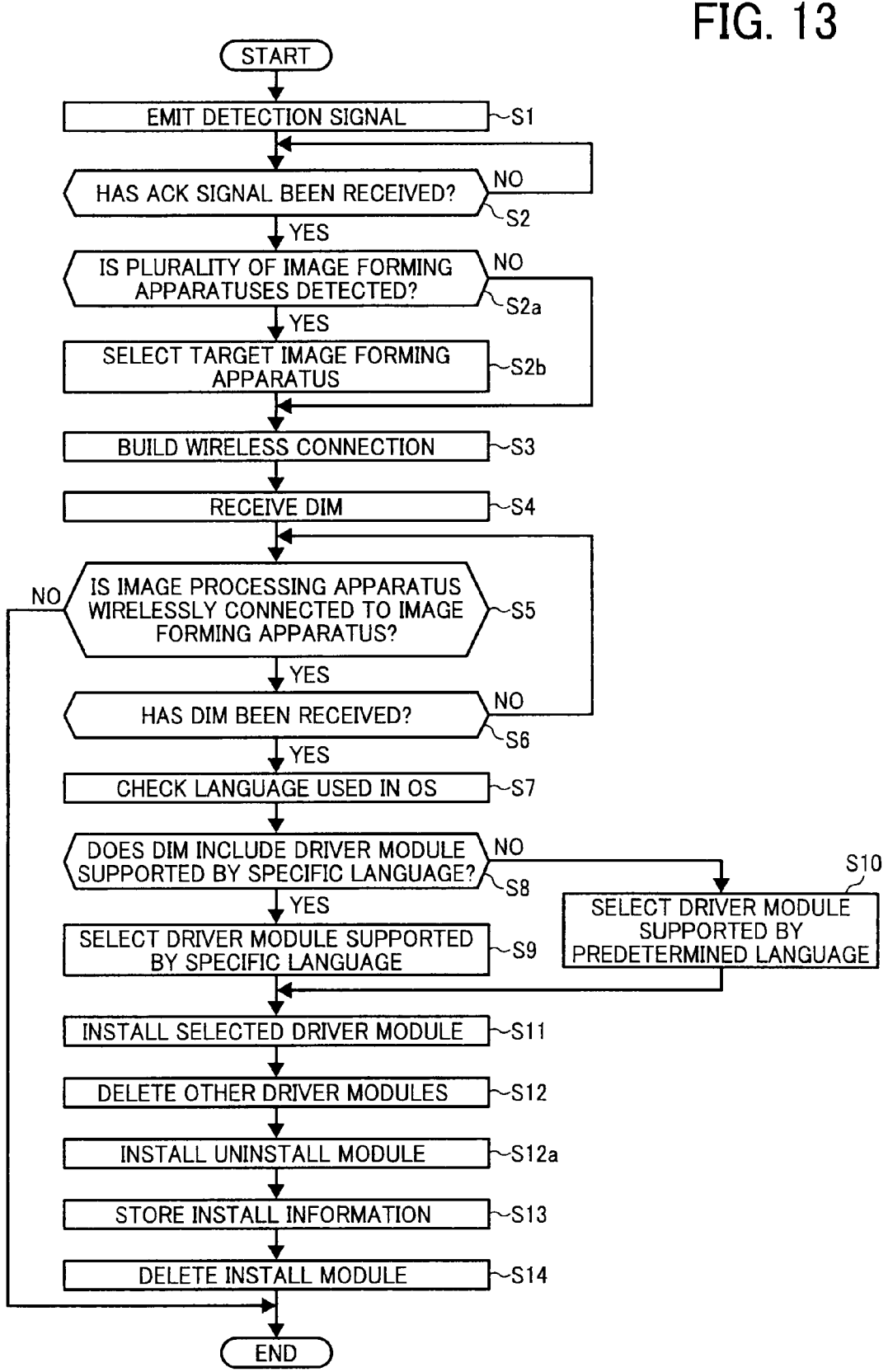
FIG. 13 is a flowchart of an install process according to a third embodiment of the present invention.

FIG. 13 is a flowchart of an install process according to the third embodiment in which the image processing apparatus 50A having the function of automatically selecting a target one from among the image forming apparatuses receives the driver module for the image forming apparatus and the uninstall module for the driver module. In the install process, the image processing apparatus 50A receives the driver module and the uninstall module by executing the control program stored in the storage unit 45 in Steps S1 to S14, S2*a*, and S2*b*. The image processing apparatus 50A selects the image forming apparatus to be connected in Steps S2*a* and S2*b* that are located between Steps S2 and S3. Steps corresponding to those shown in FIG. 4 are denoted with the same reference numerals. The explanation about Steps S1 to S14 is not repeated because those steps have been explained with reference to FIG. 4.

The second transmission/reception control unit 18 determines whether a plurality of image forming apparatuses is detected, i.e., whether the wireless I/F unit 40A receives the ACK signal from a plurality of image forming apparatuses (Step S2*a*). Step S2*a* is performed spaced a predetermined interval from Step S2. The interval depends on an allowable difference between times at which ACK signals are received from the image forming apparatuses.

If the plurality of image forming apparatuses is detected (Yes at Step S2*a*), the second transmission/reception control unit 18 automatically selects one of the image forming apparatuses as the target image forming apparatus to be connected (Step S2*b*). The second transmission/reception control unit 18 selects, for example, an image forming apparatus that has the highest transmission speed by comparing the transmission speeds of the image forming apparatuses calculated by the transmission-speed calculating unit 43. It has been known that if two devices are wirelessly connected to each other directly without any network, the longer the distance between the devices is, the lower the transmission speed between the devices is. Therefore, the second transmission/reception control unit 18 can select an image forming apparatus that is located closest to the image processing apparatus 50A.

After that, the wireless connection between the image processing apparatus 50A and the image forming apparatus selected at Step S2*b* is built (Step S3). If a plurality of image forming apparatuses is not detected, i.e., a single image forming apparatus is detected (No at Step S2*a*), the wireless connection between the image processing apparatus 50A and the single image forming apparatus is built (Step S3).

In this manner, the image processing apparatus automatically builds the wireless connection between the image forming apparatus having the highest transmission speed and itself. As a result, the user can print out desired image immediately when the user wishes to. Such an information processing system is easy for the user to operate especially who do not have standards for selecting the image forming apparatus to be connected. Moreover, such an information processing system is particularly usable when there is no need to select a specific image forming apparatus as the image forming apparatus to be connected.

Figure 14:
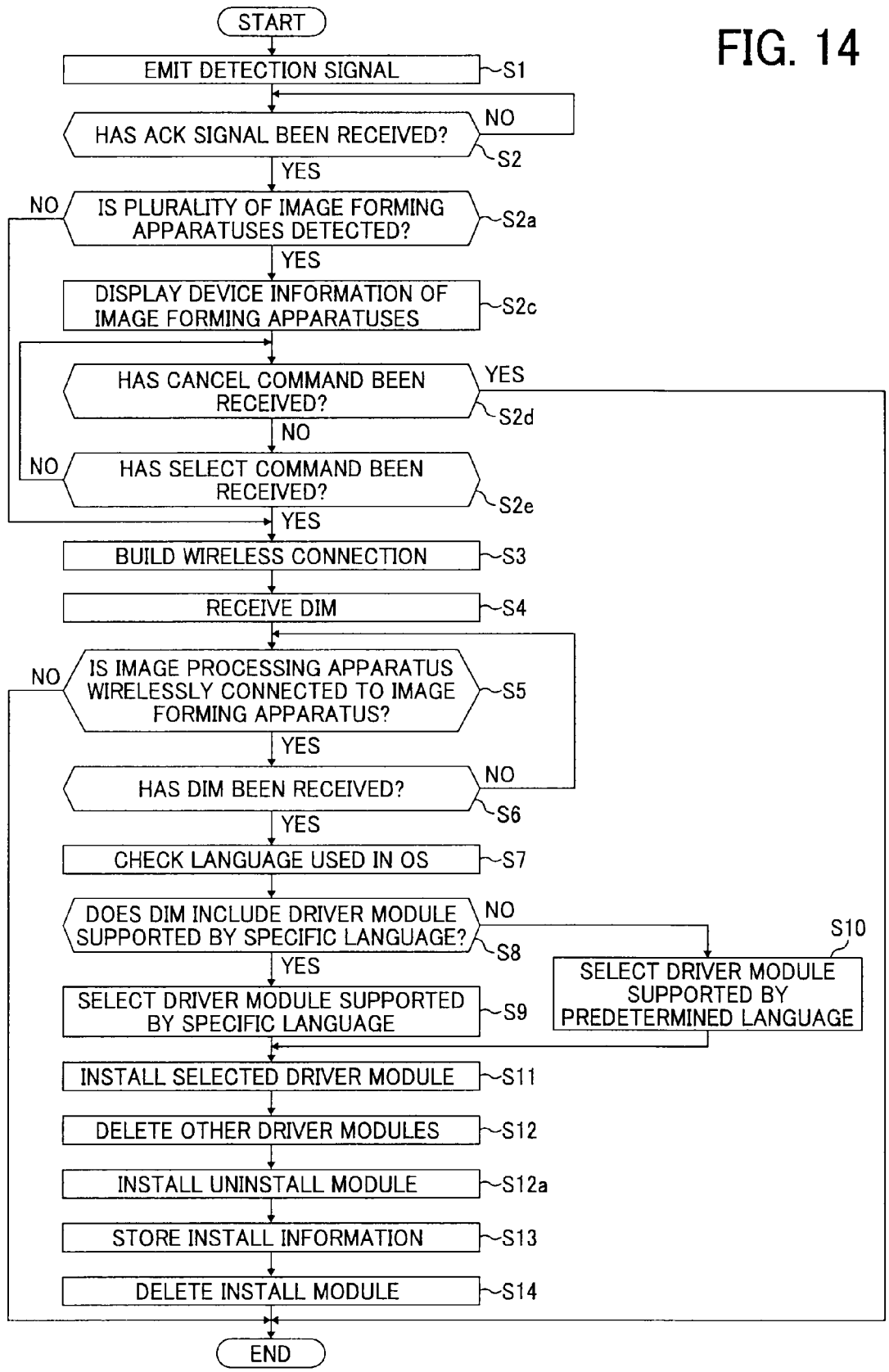
FIG. 14 is a flowchart of another install process according to the third embodiment.

FIG. 14 is a flowchart of another install process according to the third embodiment in which the image processing apparatus 50A having the function of selecting at least one from among the image forming apparatuses based on a command from the user receives the driver module for the image forming apparatus and the uninstall module for the driver module. In the install process, the image processing apparatus 50A selects the image forming apparatus to be connected in Steps S2*c* to S2*e* instead of Step S2*b* shown in FIG. 13. Steps corresponding to those shown in FIG. 13 are denoted with the same reference numerals. The explanation about the steps except Steps S2*c* to S2*e* is not repeated because those steps have been explained with reference to FIG. 13.

The image processing apparatus 50A displays device information of the image forming apparatuses on the display unit 10 (Step S2*c*). Each of the image forming apparatuses 100A includes the storage unit pre-stores, by its manufacture or the like, therein individual device information including the device name or the specifications. The transmission/reception control unit reads the device information from the storage unit and transmits the ACK signal attached with the device information to the image processing apparatus 50A. When the wireless I/F unit 40A receives the ACK signal attached with the device information from each of the image forming apparatuses, the second transmission/reception control unit 18 sends a signal indicative of the device information being received to the display control unit 14. Upon receiving the signal, the display control unit 14 displays the device information on the display unit 10.

The second transmission/reception control unit 18 determines whether a cancel command to cancel building of the wireless connection has been received from the user (Step S2*d*). The user determines based on the device information displayed on the display unit 10 whether the image processing apparatus 50A is to be connected to a specific one of the image forming apparatuses or whether the image processing apparatus 50A is not to be connected to any of the image forming apparatuses, and inputs a command corresponding to a result of the determination through the input unit 5. If the cancel command has been received (Yes at Step S2*d*), the process control goes to end. If the cancel command has not been received (No at Step S2*d*), the second transmission/reception control unit 18 determines whether a select command to specify an image forming apparatus as the target image forming apparatus to be connected has been received from the user (Step S2*e*). If the select command has not been received (No at Step S2*e*), the process control returns to Step S2*d*. If the select command has been received (Yes at Step S2*e*), the wireless connection between the image processing apparatus 50A and the image forming apparatus selected by the user at Step S2*e* is built (Step S3).

In this manner, the user can select the image forming apparatus capable of printing a desired image and cause the image processing apparatus to be wirelessly connected to the selected image forming apparatus. Therefore, even if the user uses the information processing system in the first time, the user can print out the desired image without fails.

It is allowable to use any display mode for displaying the device information of the image forming apparatuses on the display unit 10 at Step S2*c*. Examples of the display mode are shown in FIGS. 15 and 16.

Figure 15:
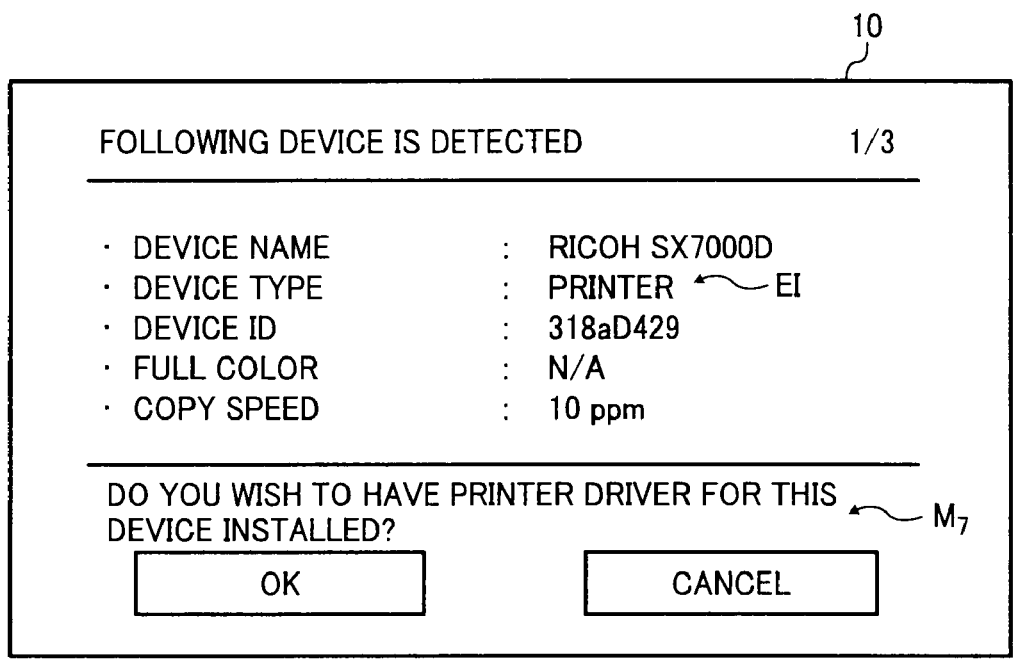
FIG. 15 is a schematic diagram of a screen displayed in the install process shown in FIG. 14.

FIG. 15 is a schematic diagram of a screen of the display unit 10 on which the device information of a single image forming apparatus is displayed per page. Device information EI is displayed on a center area of the screen. Under the device information EI displayed a message $M_7$ asking the user whether the currently-displayed image forming apparatus is to be selected. An indicator saying ⅓ is displayed on the upper-right corner of the screen, in which "3" represents the total number of detected image forming apparatuses and "1" represents where the currently-displayed image forming apparatus is in the order of detected image forming apparatuses if earlier-detected one is placed ahead.

Figure 16:
FIG. 16 is a schematic diagram of another screen displayed in the install process shown in FIG. 14.

FIG. 16 is a schematic diagram of another screen of the display unit 10 on which a list of device information of all the image forming apparatuses is displayed. The device information EI is displayed on the center area of the screen in a form of list. There are check buttons (aligned small circles) on the left side of the screen. The check buttons are used to select the image forming apparatus to be connected.

An image processing apparatus 50B according to a fourth embodiment of the present invention displays, when the image processing apparatus 50B is wirelessly disconnected from the image forming apparatus without receiving a disconnect command to disconnect the image processing apparatus 50B from the image forming apparatus from the user via the input unit 5, a message of requesting the user to approach the image forming apparatus (hereinafter, "approach-request message").

Figure 17:
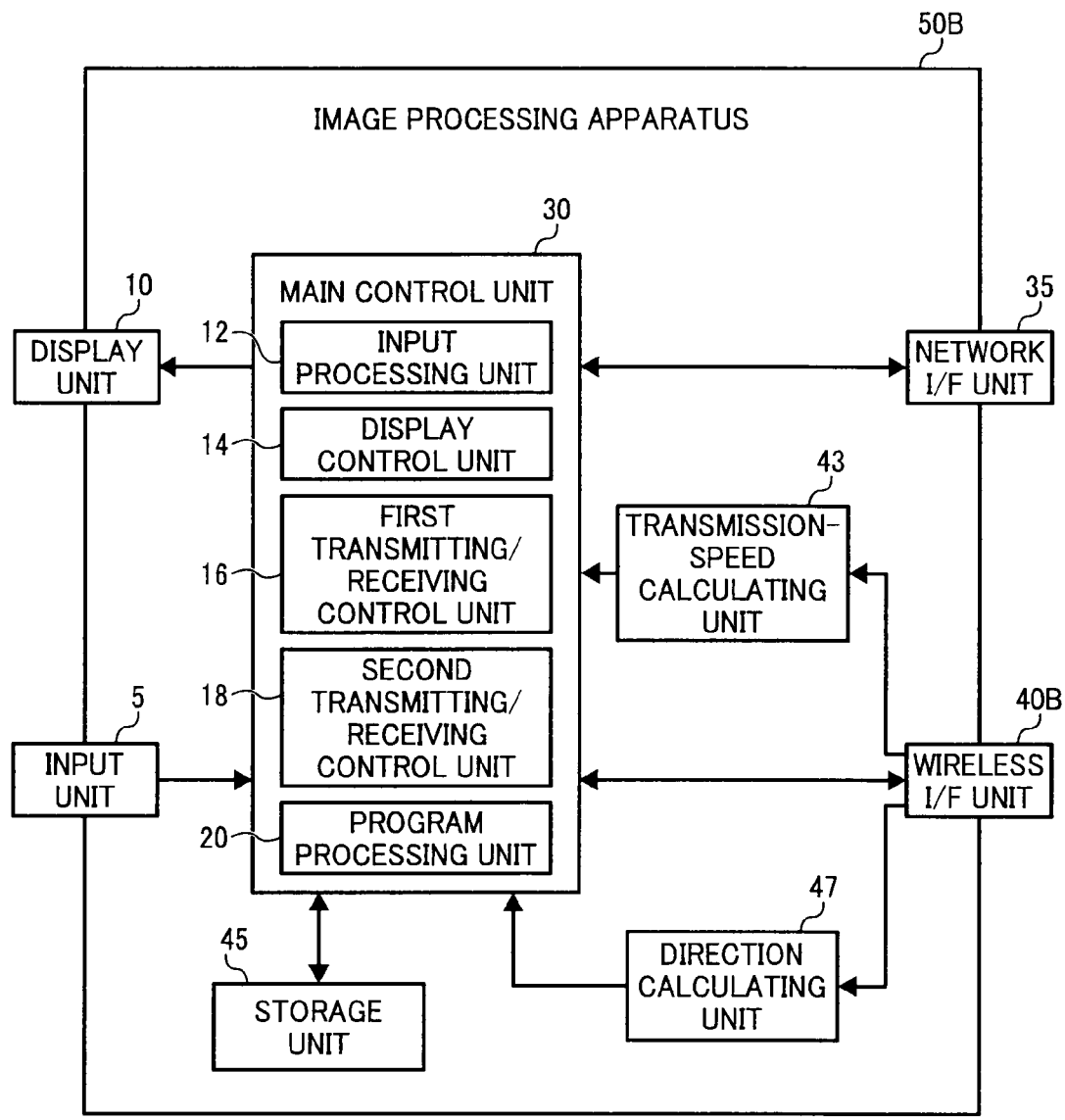
FIG. 17 is a block diagram of an image processing apparatus according to a fourth embodiment of the present invention.

FIG. 17 is a block diagram of the image processing apparatus 50B. The image processing apparatus 50B includes a direction calculating unit 47 and a wireless I/F unit 40B connected to each other. The direction calculating unit 47 repeatedly calculates a direction to the image forming apparatus while the image processing apparatus 50B is wirelessly connected to the image forming apparatus. The wireless I/F unit 40B includes a plurality of antennas heading different directions from one another (not shown).

The direction calculating unit 47 repeatedly calculates the direction to the image forming apparatus based on, for example, the intensity of signals received by the antennas of the wireless I/F unit 40B, and sequentially sends results of calculation to the second transmission/reception control unit 18. The second transmission/reception control unit 18 stores the results of calculation in the storage unit 45. If the image processing apparatus 50B is wirelessly disconnected from the image forming apparatus without receiving the disconnect command via the input unit 5, for example, if the image processing apparatus 50B accidentally exits out of the CA of the image forming apparatus, the second transmission/reception control unit 18 identifies the direction to the image forming apparatus based on the latest result of calculation stored in the storage unit 45.

Upon identifying the direction to the image forming apparatus, the second transmission/reception control unit 18 sends data indicative of the identified direction and a display command to the display control unit 14. Upon receiving the data indicative of the identified direction and the display command, the display control unit 14 displays on the display unit 10 the identified direction to the image forming apparatus and the approach-request message.

Figure 18:
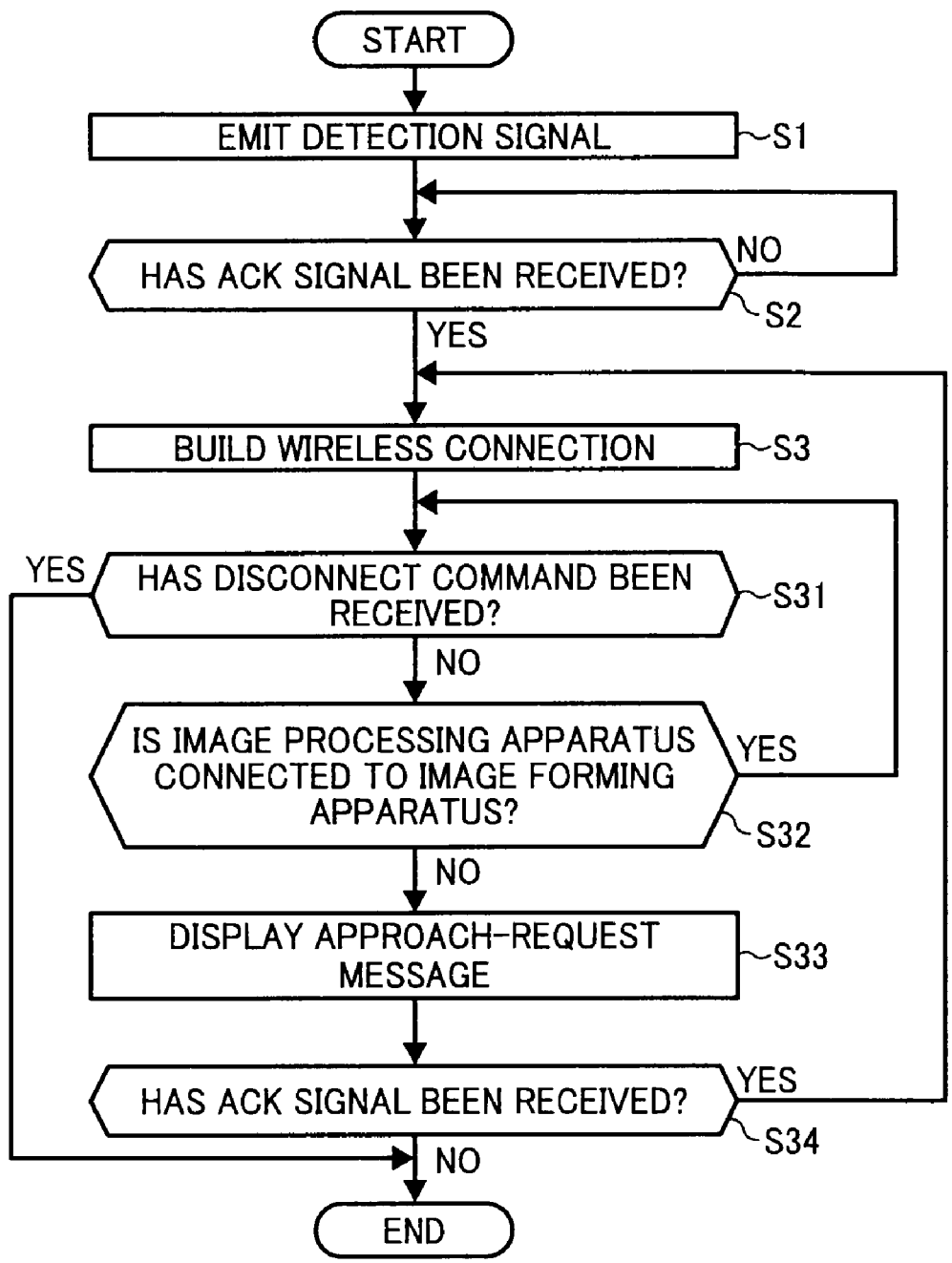
FIG. 18 is a flowchart of an approach-request displaying process according to the fourth embodiment.

FIG. 18 is a flowchart of an approach-request displaying process according to the fourth embodiment performed by the image processing apparatus 50B. In the approach-request displaying process, the image processing apparatus 50B performs Steps S1 to S3, S31, S32 and S34 by executing the control program stored in the storage unit 45, and performs Step S33 by executing the control program or a computer program in the driver module.

Steps corresponding to those shown in FIG. 4 are denoted with the same reference numerals. The image processing apparatus 50B builds the wireless connection between the image forming apparatus and itself in Steps S1 to S3. After that, the second transmission/reception control unit 18 determines whether the disconnect command has been received via the display unit 10 (Step S31). If the disconnect command has been received (Yes at Step S31), the process control goes to end.

If the disconnect command has not been received (No at Step S31), the second transmission/reception control unit 18 determines whether the image processing apparatus 50B is wirelessly connected to the image forming apparatus (Step S32). If the image processing apparatus 50B is wirelessly connected to the image forming apparatus (Yes at Step S32), Step S31 is repeated. If the image processing apparatus 50B is not wirelessly connected to the image forming apparatus (No at Step S32), the display control unit 14 displays the approach-request message on the display unit 10 (Step S33). When a predetermined time has passed since the approach-request message is displayed, the second transmission/reception control unit 18 determines whether the ACK signal in response to the detection signal that is periodically emitted from the image processing apparatus 50B has been received from the image forming apparatus (Step S34). If the ACK signal has not been received (No at Step S34), the process control goes to end. If the ACK signal has been received (Yes at Step S34), Step S3 and the succeeding steps are repeated.

In this manner, if the image processing apparatus 50B is wirelessly disconnected from the image forming apparatus despite the intention of the user, the image processing apparatus 50B displays the approach-request message on the display unit 10. This facilitates re-building of the wireless connection between the image processing apparatus 50B and the image forming apparatus.

From viewpoint of the lower electric consumption, it is preferable to switch the image forming apparatus between the save mode and the normal mode as required. In an information processing system according to a fifth embodiment of the present invention, the image forming apparatus 100A is configured to be in the save mode until the transmission/reception control unit 70 detects the image processing apparatus, and is shifted to the normal mode after detection of the image processing apparatus. With this configuration, the electric consumption required for the information processing system will be lower.

It is preferable that the image forming apparatus 100A shifts to the save mode when a predetermined time has passed since the image forming apparatus 100A is wirelessly disconnected from the image processing apparatus. The power-supply control unit 72, for example, controls switching between the save mode and the normal mode.

Figure 19:
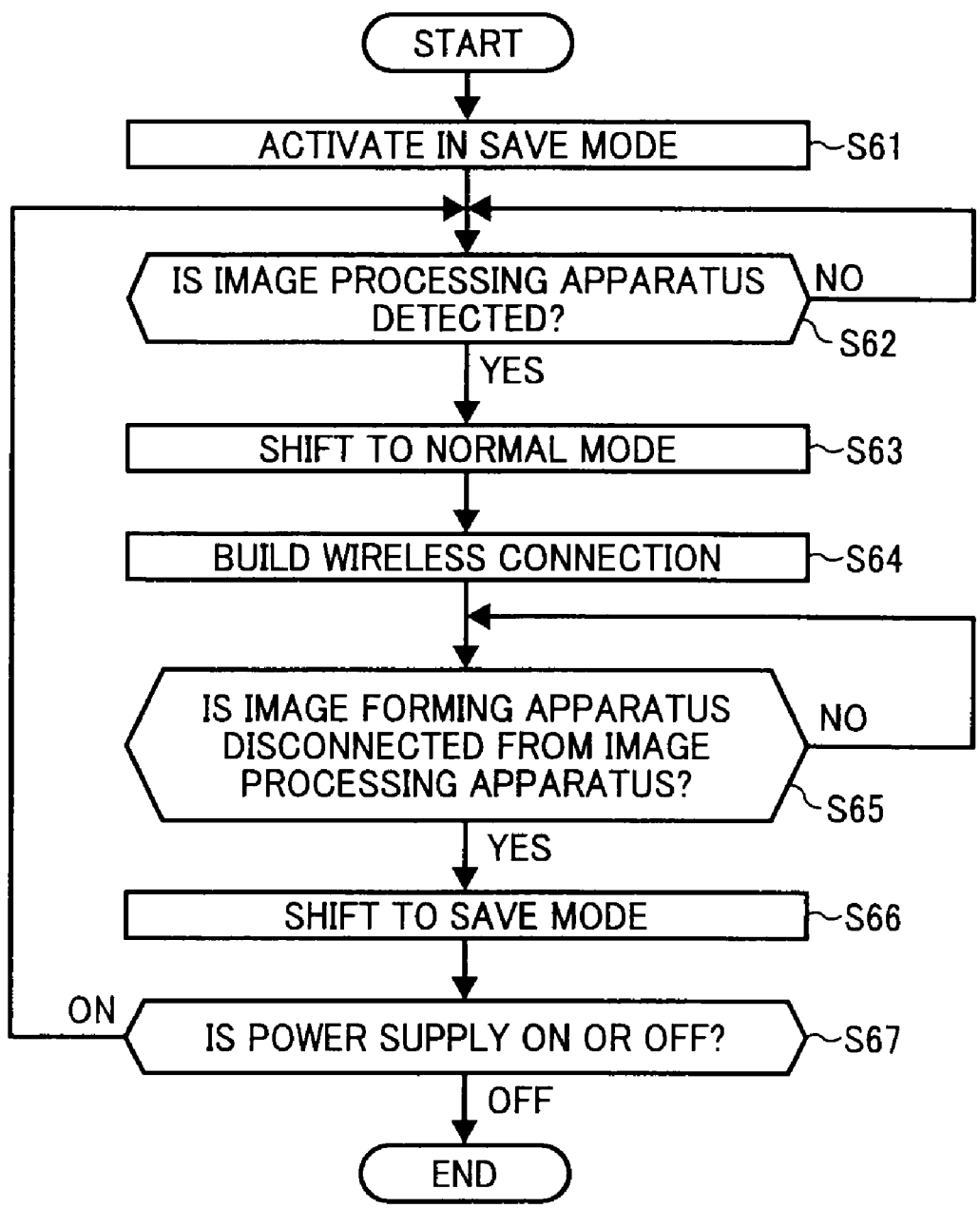
FIG. 19 is a flowchart of a mode-shift process according to a fifth embodiment of the present invention.

FIG. 19 is a flowchart of a mode-shift process according to the fifth embodiment performed by the image forming apparatus 100A. In the mode-shift process, the image forming apparatus 100A controls switching between the save mode and the normal mode by executing the control program stored in the storage unit 90 in Steps S61 to S67.

When the image forming apparatus 100A is turned on, the power-supply control unit 72 activates the image forming apparatus 100A in the save mode by using the power supply circuit 95 (Step S61). The power-supply control unit 72 determines whether the transmission/reception control unit 70 detects the image processing apparatus (Step S62). If the transmission/reception control unit 70 does not detect the image processing apparatus (No at Step S62), Step S62 is repeated. If the transmission/reception control unit 70 detects the image processing apparatus (Yes at Step S62), the power-supply control unit 72 shifts the image forming apparatus 100A to the normal mode by switching the power supply circuit 95 (Step S63).

After the image forming apparatus 100A is shifted to the normal mode, the transmission/reception control unit 70 builds the wireless connection between the image processing apparatus and itself (Step S64). The power-supply control unit 72 determines whether the image forming apparatus 100A is wirelessly disconnected from the image processing apparatus by, for example, periodically monitoring the transmission/reception control unit 70 (Step S65). If the image forming apparatus 100A is not wirelessly disconnected from the image processing apparatus (No at Step S65), Step S65 is repeated. If the image forming apparatus 100A is wirelessly disconnected from the image processing apparatus (Yes at Step S65), the power-supply control unit 72 shifts, when a predetermined time has passed since the image forming apparatus 100A is wirelessly disconnected from the image processing apparatus, the image forming apparatus 100A to the save mode by switching the power supply circuit 95 (Step S66).

The power-supply control unit 72 determines whether the power-supply switch is OFF (Step S67). If the power-supply switch is OFF (OFF at Step S67), the image forming apparatus 100A is turned off. If the power-supply switch is ON (ON at Step S67), Step S62 and the succeeding steps are repeated.

An information processing system according to a sixth embodiment include an image forming apparatus 100B having an automatic activation function of activating itself in response to a change of ambient conditions by, for example, sensing light intensity. The image forming apparatus 100B is activated in the save mode, and shifted to the normal mode when the image processing apparatus is detected. With this configuration, the electric consumption required in the information processing system will be lower.

Figure 20:
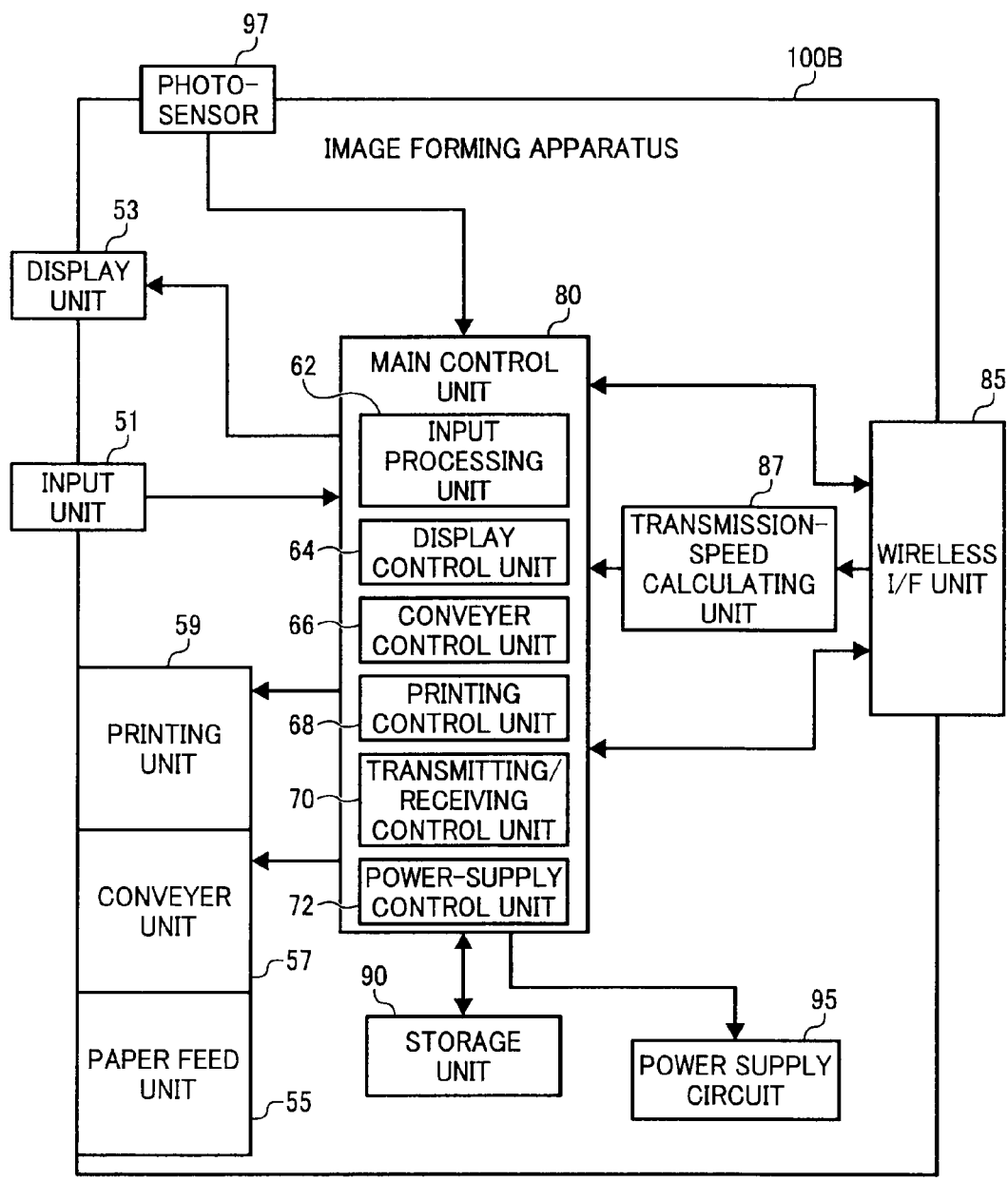
FIG. 20 is a block diagram of an image forming apparatus according to a sixth embodiment of the present invention.

FIG. 20 is a block diagram of the image forming apparatus 100B. The image forming apparatus 100B has the same structure as the image forming apparatus 100A except that the image forming apparatus 100B includes a photosensor 97. Parts corresponding to those in the image forming apparatus 100A are denoted with the same reference numerals, and the same description is not repeated.

When, for example, a light of a room where the image forming apparatus 100B is installed is turned on and it is determined that the light intensity detected by the photosensor 97 exceeds a threshold, the electric power is supplied to the image forming apparatus 100B and the image forming apparatus 100B is activated in the normal mode. When the transmission/reception control unit 70 detects the image processing apparatus, the image forming apparatus 100B is shifted to the normal mode. It is preferable that if the image forming apparatus 100B is wirelessly disconnected from the image processing apparatus, the image forming apparatus 100A is shifted to the save mode when a predetermined time has passed since the disconnection.

Figure 21:
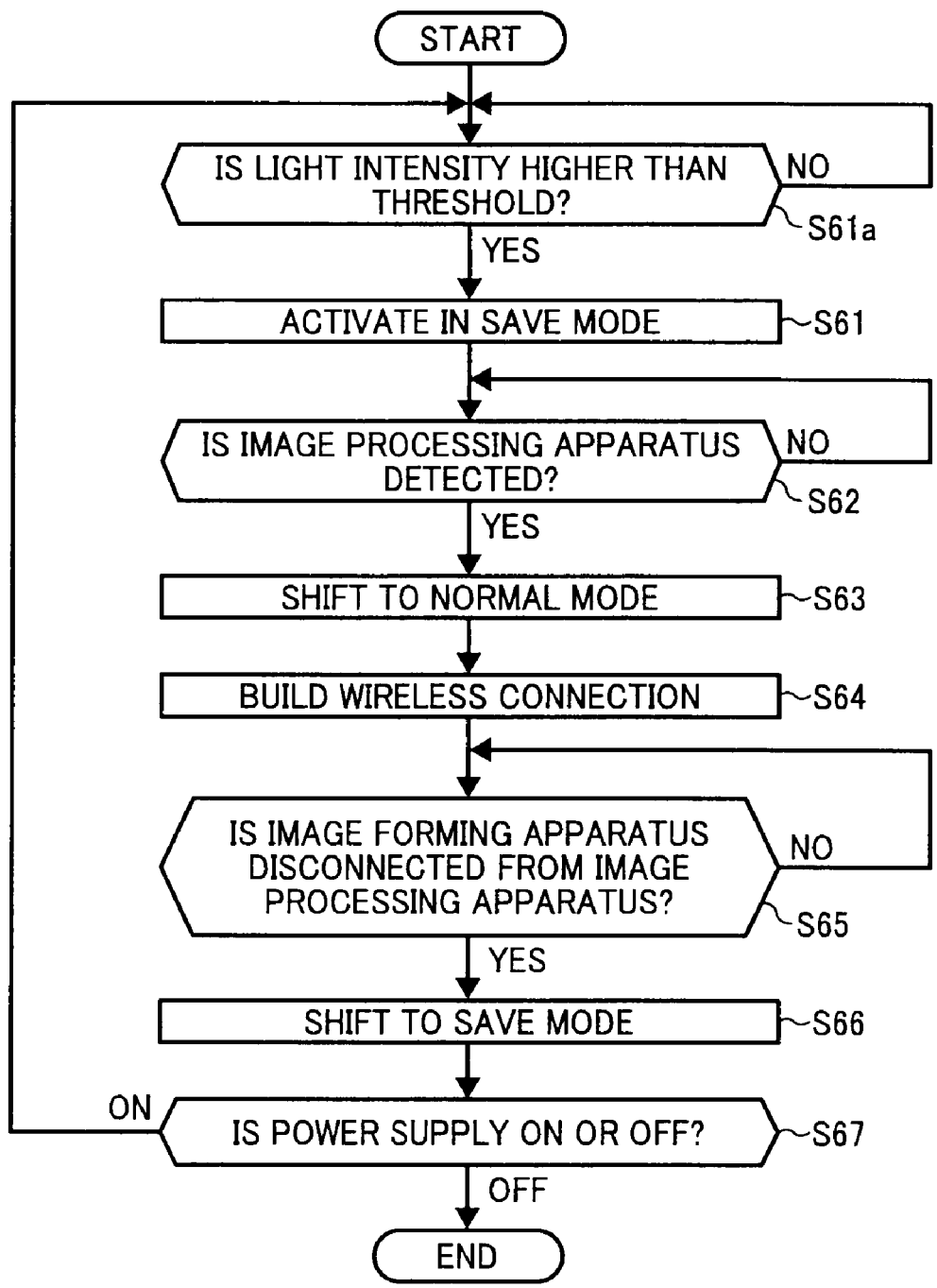
FIG. 21 is a flowchart of a mode-shift process according to the sixth embodiment.

FIG. 21 is a flowchart of a mode-shift process according to the sixth embodiment performed by the image forming apparatus 100B. In the mode-shift process, the image forming apparatus 100B controls switching between the save mode and the normal mode by executing the control program stored in the storage unit 90 in Steps S61a and S61 to S67. Steps corresponding to those shown in FIG. 19 are denoted with the same reference numerals. The explanation about Steps S61 to S67 is not repeated because those steps have been explained with reference to FIG. 19. If the power-supply switch is determined to be ON (ON at Step S67), Step S61a and the succeeding steps are repeated.

The power-supply control unit 72 determines whether the light intensity detected by the photosensor 97 exceeds the threshold (Step S61a). If the light intensity does not exceed the threshold (No at Step S61a), Step S61a is repeated. If the light intensity exceeds the threshold (Yes at Step S61a), Steps S61 and the succeeding steps are performed.

The image forming apparatus can be configured to transmit a server module to a first image processing apparatus via wireless communications. The first image processing apparatus works as a print server for a second image processing apparatus that is connected to the first image processing apparatus via a network.

Figure 22:
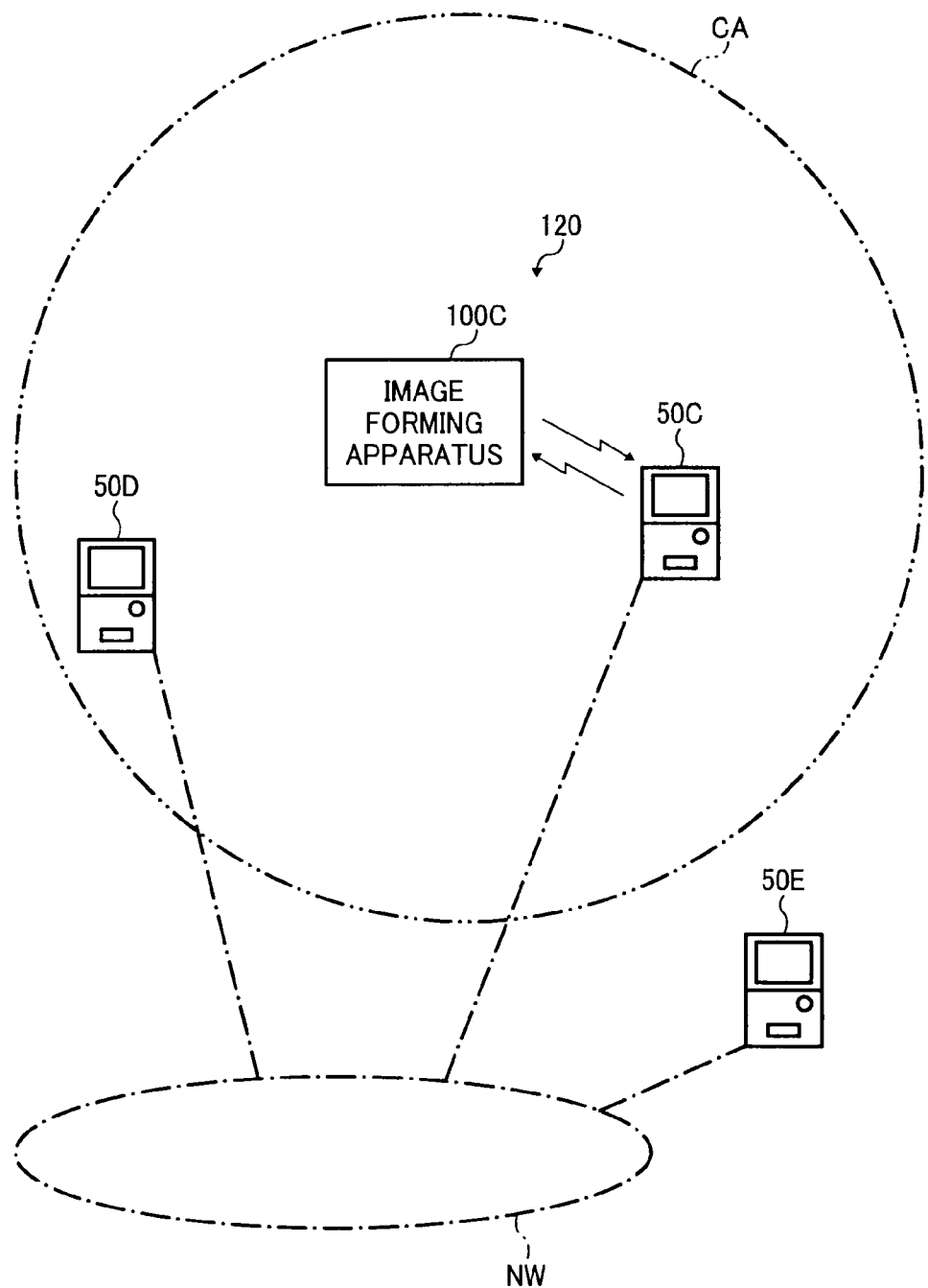
FIG. 22 is a schematic diagram of an information processing system according to a seventh embodiment of the present invention.

FIG. 22 is a schematic diagram of an information processing system 120 according to a seventh embodiment of the present invention. The information processing system 120 includes an image forming apparatus 100D and a plurality of image processing apparatuses 50C, 50D, and 50E. The image processing apparatus 50C is wirelessly connected to the image forming apparatus 100D directly without any network. The image processing apparatus 50C works as the print server for the image processing apparatuses 50D and 50E. Each of the image processing apparatuses 50D and 50E is connected to the image processing apparatus 50C via a network NW such as a wireless LAN.

The image forming apparatus 100C has the same structure as the image forming apparatus 100A except that the server module is pre-stored in the storage unit 90 and that the image forming apparatus 100C wirelessly transmits the server module to the image processing apparatus. The image processing apparatuses 50C, 50D, and 50E has the same structure as the image processing apparatus 50A. Parts corresponding to those in the image forming apparatus 100A and the image processing apparatus 50A are denoted with the same reference numerals, and the same description is not repeated. When the image processing apparatus 50C receives the server module from the image forming apparatus 100C and installs therein the received server module, the image processing apparatus 50C is ready to work as the print server. The image processing apparatus 50D is located inside the CA of the image forming apparatus 100C. The image processing apparatus 50E is located outside the CA because of, for example, a matter of capacity of the meeting room or an order of seats.

In the information processing system 120, the user can print the desired image out from the image forming apparatus 100C via the image processing apparatus 50C working as the print server by manipulating the image processing apparatus 50E that is outside of the CA as well as by manipulating the image processing apparatus 50C. In other words, the information processing system 120 obtains hither usability. The image processing apparatus 50D uses the image forming apparatus 100C as the output device either by wirelessly transmitting the print data directly to the image forming apparatus 100C or by transmitting the print data to the image processing apparatus 50C working as the print server via the network without wirelessly connected to the image forming apparatus 100C.

Figure 23:
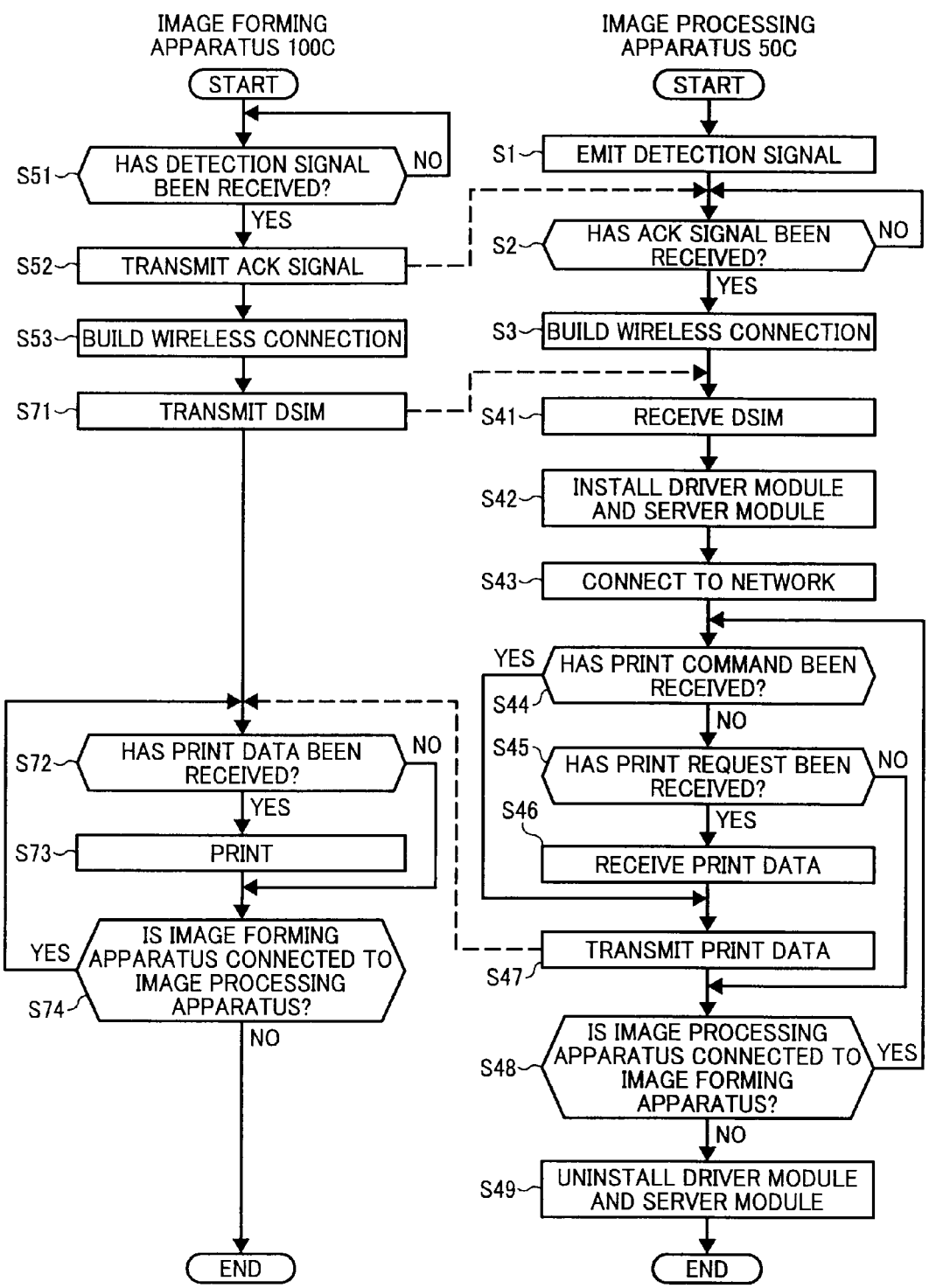
FIG. 23 is a flowchart of a general process according to the seventh embodiment.

FIG. 23 is a flowchart of a general process according to the seventh embodiment performed by the image forming apparatus 100C and the image processing apparatus 50C. In the general process, the image processing apparatus 50C receives a driver/server install module (DSIM) from the image forming apparatus 100C by executing the control program stored in the storage unit 45 in Steps S1 to S3 and S41. After that, the image processing apparatus 50C performs Step S42 by executing the install module in the DSIM, Steps S43 to S48 by executing the server module in the DSIM, and Step S49 by executing the uninstall module.

Steps corresponding to those shown in FIG. 4 are denoted with the same reference numerals. The explanation about Steps S1 to S3 is not repeated because those steps have been explained with reference to FIG. 4. The image processing apparatus 50C is the first image processing apparatus that the image forming apparatus 100C detects from among the image processing apparatuses 50C, 50D, and 50E.

The image processing apparatus 50C receives the DSIM from the image forming apparatus 100C (Step S41). The DSIM includes the driver module for the image forming apparatus 100C, the server module, the install module for installing the driver module and the server module, and the uninstall module for the driver module and the server module.

Upon receiving the DSIM, the image processing apparatus 50C installs therein the driver module and the server module by executing the install module. The image processing apparatus 50C is ready to work as the print server by installing therein the server module.

After being ready to work as the print server, the image processing apparatus 50C performs Steps S43 to S48 by executing a predetermined computer program in the server module. More particularly, the image processing apparatus 50C is connected to the network NW (Step S43). The input processing unit 12 then determines whether a print command has been received from the user via the input unit 5 (Step S44). The print command is a command to print data that is originally stored in the image processing apparatus 50C out from the image forming apparatus 100C. If the print command has been received (Yes at Step S44), the process control goes to Step S47. If the print command has not been received (No at Step S44), the first transmission/reception control unit 16 determines whether a print request has been received via the network I/F unit 35 from the image processing apparatus 50D or 50E that is connected via the network NW (Step S45).

If the print request has been received from the image processing apparatus 50D or 50E (Yes at Step S45), the first transmission/reception control unit 16 receives print data from the image processing apparatus 50D or 50E via the network I/F unit 35, stores the received print data in the storage unit 45, and sends a signal indicative that the print data is stored in the storage unit 45 to the second transmission/reception control unit 18 (Step S46). Upon receiving the signal from the first transmission/reception control unit 16 or determining that the print command has been received at Step S44, the second transmission/reception control unit 18 reads the print data from the storage unit 45 and wirelessly transmits the print data to the image forming apparatus 100C via the wireless I/F unit 40A (Step S47).

After that, the image processing apparatus 50C determines whether the image processing apparatus 50C is wirelessly connected to the image forming apparatus 100C (Step S48). If the image processing apparatus 50C is wirelessly connected to the image forming apparatus 100C (Yes at Step S48), Step S44 and the succeeding steps are repeated. On the other hand, if the image processing apparatus 50C is not wirelessly connected to the image forming apparatus 100C (No at Step S48), the image processing apparatus 50C uninstalls the driver module and the server module by executing the uninstall module (Step S49) and the process control goes to end.

In the general process, the image forming apparatus 100C performs Steps S51 to S53 and S71 to S74 by executing the control program stored in the storage unit 90. More particularly, the image forming apparatus 100C builds the wireless connection between the image processing apparatus 50C and itself in Steps S51 to S53. Steps corresponding to those shown in FIG. 5 are denoted with the same reference numerals. The explanation about Steps S51 to S53 is not repeated because those steps have been explained with reference to FIG. 5.

The transmission/reception control unit 70 reads the DSIM from the storage unit 90 and wirelessly transmits the obtained DSIM to the image processing apparatus 50C via the wireless I/F unit 85 (Step S71). After that, the transmission/reception control unit 70 determines whether the print data has been received from the image processing apparatus 50C via the wireless I/F unit 85 (Step S72). If the print data has been received (Yes at Step S72), the image forming apparatus 100C prints the desired image out based on the received print data. If the print data has not been received (No at Step S72), the transmission/reception control unit 70 determines whether the image forming apparatus 100C is wirelessly connected to the image processing apparatus 50C (Step S74). If the image forming apparatus 100C is wirelessly connected to the image processing apparatus 50C (Yes at Step S74), Step S72 and the succeeding steps are repeated. If the image forming apparatus 100C is not wirelessly connected to the image processing apparatus 50C (No at Step S74), the process control goes to end.

The information processing system can be configured to switch the print server from the first image processing apparatus to the second image processing apparatus if the first image processing apparatus is wirelessly disconnected from the image forming apparatus before transmitting print data to the image forming apparatus. The print data that the first image processing apparatus fails to transmit to the image forming apparatus (hereinafter, "un-transmitted print data") is wirelessly transmitted from the second image processing apparatus to the image forming apparatus, and printed out from the image forming apparatus.

Figure 24:
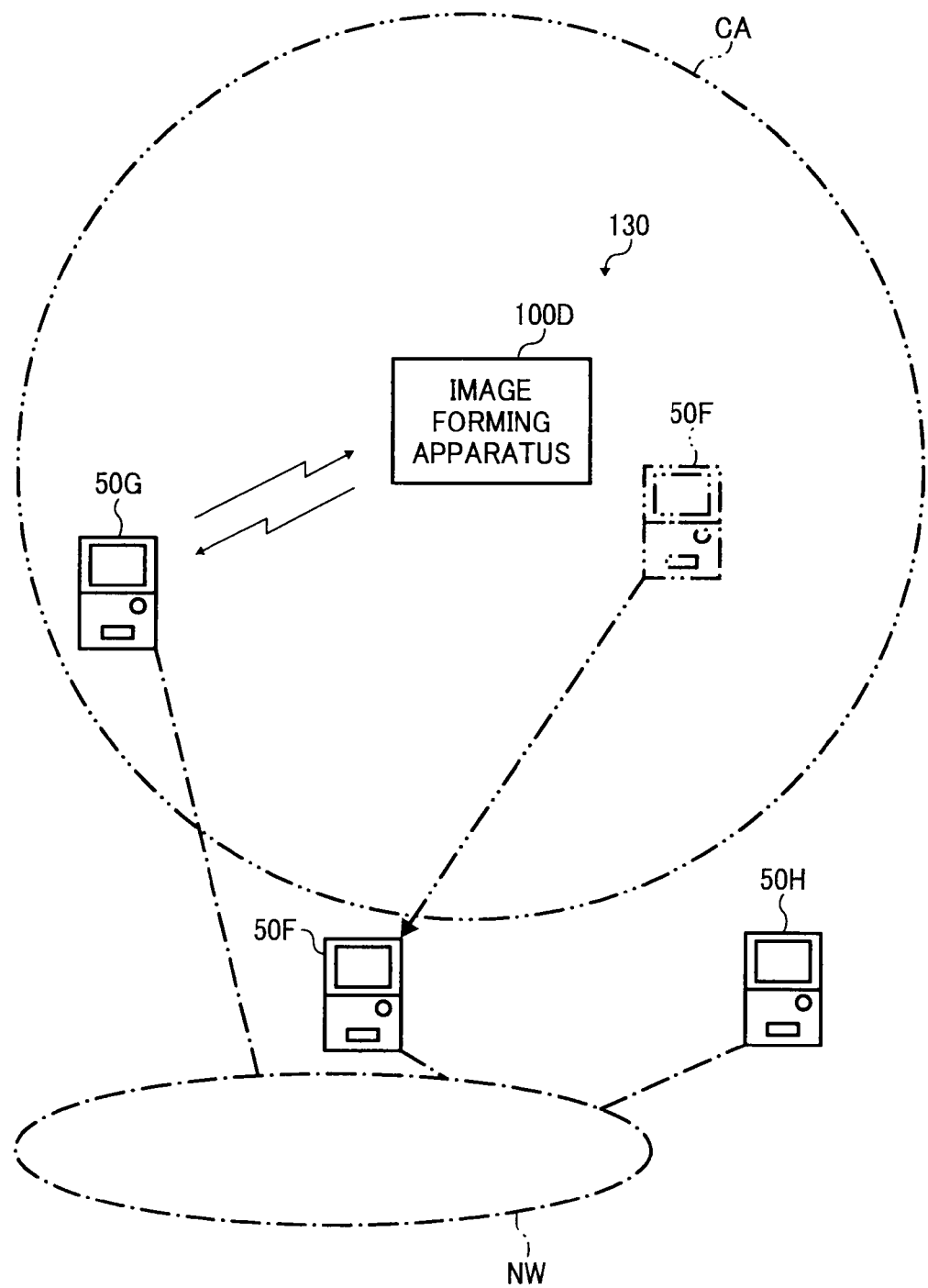
FIG. 24 is a schematic diagram of an information processing system according to an eighth embodiment of the present invention.

FIG. 24 is a schematic diagram of an information processing system 130 capable of switching the print server according to an eighth embodiment of the present invention. The information processing system 130 includes the image forming apparatus 100D and a plurality of image processing apparatuses 50F, 50G, and 50H. The image processing apparatus 50F works as the print server, firstly. If the image processing apparatus 50F moves to a point outside the CA of the image forming apparatus 100D and thereby wirelessly disconnected from the image forming apparatus 100D before transmitting print data to the image forming apparatus 100D, the image processing apparatus 50G works as the print server, secondly.

After that, the image processing apparatus 50F transmits the un-transmitted print data to the image processing apparatus 50G via the network. Upon receiving the un-transmitted print data from the image processing apparatus 50F, the image processing apparatus 50G wirelessly transmits the un-transmitted print data to the image forming apparatus 100D. Thus, the un-transmitted print data is printed out from the image forming apparatus 100D.

The image forming apparatus 100D has the same structure as the image forming apparatus 100A except that the image forming apparatus 100D wirelessly transmits, to the image processing apparatus 50G, the server module and a command to receive the un-transmitted print data from the image processing apparatus 50F via the network NW. The image processing apparatuses 50F, 50G, and 50H has the same structure as the image processing apparatus 50A. Parts corresponding to those in the image forming apparatus 100A and the image processing apparatus 50A are denoted with the same reference numerals, and the same description is not repeated.

In the information processing system 130, if the image processing apparatus 50F that works as the print server firstly has to move to a point outside the CA of the image forming apparatus 100D before transmitting print data to the image forming apparatus 100D, the desired image corresponding to the print data is printed out from the image forming apparatus 100D without the re-transmitting process in which the image processing apparatus 50G or 50H re-transmits the same print data that has been transmitted to the image processing apparatus 50F via the network NW to the image processing apparatus 50G. In other words, the information processing system 130 obtains higher usability.

Figure 25:
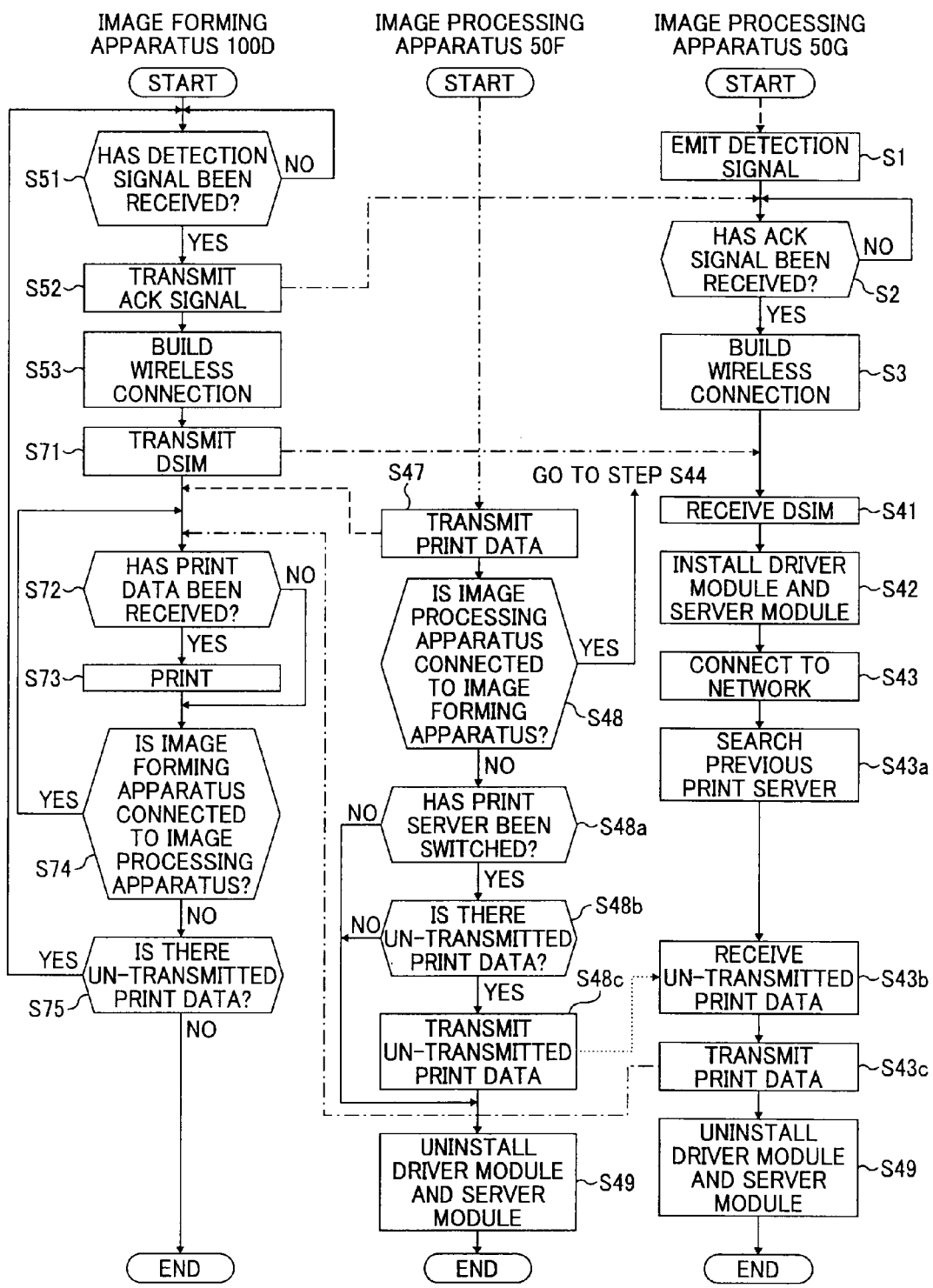
FIG. 25 is a flowchart of a general process according to the eighth embodiment.

FIG. 25 is a flowchart of a general process performed by the information processing system 130. In the general process, the image processing apparatus 50F works as the print server firstly, and the image processing apparatus 50G works as the print server, secondly. The image forming apparatus 100D performs Steps S51 to S53 and S71 to S75 by executing the control program stored in the storage unit 90. More particularly, the image forming apparatus 100D builds the wireless connection between the image processing apparatus 50F and itself in Steps S51 to S53, and wirelessly transmits the DSIM including the driver module, the install module, the server module, and the uninstall module to the image processing apparatus 50F at Step S71. Steps corresponding to those shown in FIG. 23 are denoted with the same reference numerals. The explanation about Steps S51 to S53 and S71 to S74 is not repeated because those steps have been explained with reference to FIG. 23.

If the image forming apparatus 100D is not wirelessly connected to image processing apparatus 50F (No at Step S74), the transmission/reception control unit 70 determines whether there is un-transmitted print data (Step S75). For example, if the image processing apparatus 50F is wirelessly disconnected from the image forming apparatus 100D before or in a course of transmitting the print data, the transmission/reception control unit 70 determines that there is un-transmitted print data.

If there is no un-transmitted print data (No at Step S75), the process control goes to end. If there is un-transmitted print data (Yes at Step S75), Step S51 and the succeeding steps are repeated. This time, the image processing apparatus 50F is not wirelessly connectable to the image forming apparatus 100D. Therefore, the image forming apparatus 100D builds the wireless connection between the image processing apparatus 50G that is inside the CA and itself. The image forming apparatus 100D wirelessly transmits the DSIM, the command to receive the un-transmitted print data from the image processing apparatus 50F via the network NW, and data for identifying the image processing apparatus 50F to the image processing apparatus 50G (Step S71), and waits until receiving the print data from the image processing apparatus 50G.

The image processing apparatus 50F, which works as the print server firstly, receives the DSIM from the image forming apparatus 100D by executing the control program stored in the storage unit 45 in Steps S1 to S3 and S41. After that, the image processing apparatus 50F performs Step S42 by executing the install module in the DSIM, Steps S43 to S48 and S48a to S48c by executing the server module, and Step S49 by executing the uninstall module.

Steps corresponding to those shown in FIG. 23 are denoted with the same reference numerals. The explanation about the above steps except Steps S48a to S48c is not repeated because those steps have been explained with reference to FIG. 23. Steps S1 to S3 and S41 to S46 performed by the image processing apparatus 50F are not shown in FIG. 25.

If the image processing apparatus 50F is not wirelessly connected to the image forming apparatus 100D (No at Step S48), the first transmission/reception control unit 16 determines whether the print server in the network NW has been switched to another image processing apparatus (Step S48a). If the print server has not been switched to another image processing apparatus (No at Step S48a), the process control goes to Step S49. If the print server has been switched to another image processing apparatus (Yes at Step S48a), the second transmission/reception control unit 18 determines whether there is un-transmitted print data (Step S48b). If, for example, the image processing apparatus 50F exits out of the CA in a course of wirelessly transmitting the print data to the image forming apparatus 100D, the print data is stored in the storage unit 45 as un-transmitted print data.

If there is no un-transmitted print data (No at Step S48b), the process control goes to Step S49. If there is un-transmitted print data (Yes at Step S48b), the first transmission/reception control unit 16 transmits the un-transmitted print data to the next print server via the network I/F unit 35 (Step S48c), and the process control goes to Step S49.

The image processing apparatus 50G, which is the next print server after the image processing apparatus 50F, receives the DSIM from the image forming apparatus 100D by executing the control program stored in the storage unit 45 in Steps S1 to S3 and S41. After that, the image processing apparatus 50G performs Step S42 by executing the install module in the DSIM, Steps S43 and S43a to S43c by executing the server module, and Step S49 by executing the uninstall module.

Steps corresponding to those shown in FIG. 23 are denoted with the same reference numerals. The explanation about the above steps except Steps S43a to S43c is not repeated because those steps have been explained with reference to FIG. 23. The DSIM that is received from the image forming apparatus 100D at Step S41 includes data for identifying the image processing apparatus 50F and the command to receive the un-transmitted print data from the image processing apparatus 50F via the network NW in addition to the driver module, the install module, the server module, and the uninstall module.

The image processing apparatus 50G is ready to work as the print server by installing the driver module and the server module (Step S42). The image processing apparatus 50G is connected to the network NW (Step S43), and searches the previous print server, i.e., the image processing apparatus 50F via the network NW (Step S43a). If the image processing apparatus 50G finds out the image processing apparatus 50F, the image processing apparatus 50G receives the un-transmitted print data from the image processing apparatus 50F via the network NW by transmitting/receiving predetermined data to/from the image processing apparatus 50F (Step S43b).

The image processing apparatus 50G wirelessly transmits the un-transmitted print data as print data to the image forming apparatus 100D (Step S43c). Upon receiving the print data, the image forming apparatus 100D prints out the desired image corresponding to the print data. The process control goes to end after Step S49 is performed.

In an information processing system according to a ninth embodiment of the present invention, a plurality of image processing apparatuses connected to each other via the network selects the print server from among themselves through transaction of data. When the image processing apparatus selected as the print server requests the server module, the image forming apparatus transmits the server module to the image processing apparatus. The image processing apparatus selected as the print server can be wirelessly connected to the image forming apparatus directly without the network either before or after the selection.

The image forming apparatus according to the ninth embodiment has the same structure as the image forming apparatus 100A. The image processing apparatuses according to the ninth embodiment has the same structure as the image processing apparatus 50A. Parts corresponding to those in the image forming apparatus 100A and the image processing apparatus 50A are denoted with the same reference numerals, and the same description is not repeated.

Figure 26:
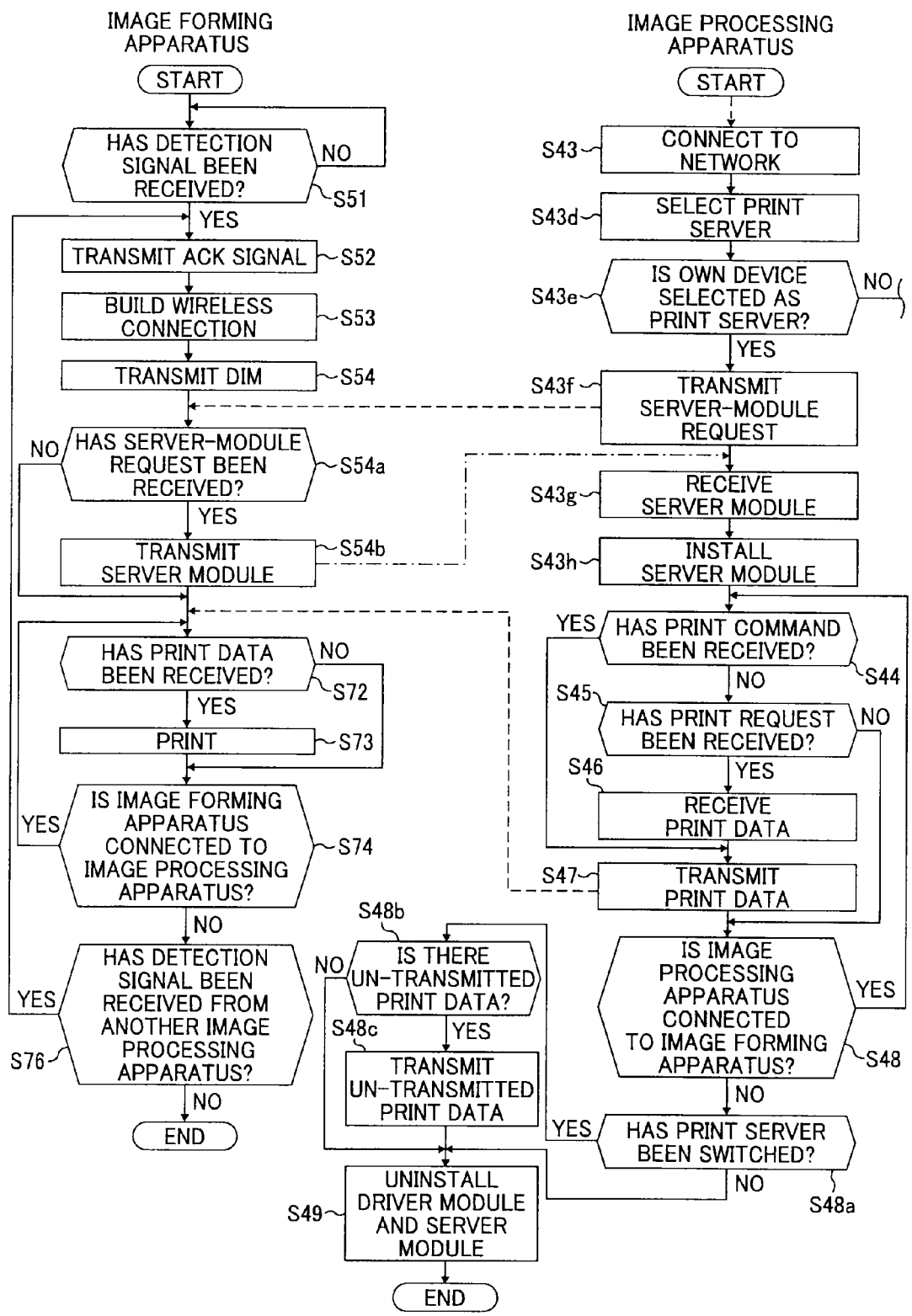
FIG. 26 is a flowchart of a general process according to a ninth embodiment according to the present invention.

FIG. 26 is a flowchart of a general process according to the ninth embodiment. In the general process, the image forming apparatus performs Steps S51 to S54, S54a, S54b, S72 to S74, and S76 by executing the control program stored in the storage unit 90. More particularly, the image forming apparatus builds the wireless connection between the image processing apparatus and itself in Step S51 to S53, and wirelessly transmits the DIM to the image processing apparatus at Step S54. Note that the DIM does not includes the server module. Steps corresponding to those shown in FIG. 5 are denoted with the same reference numerals. The explanation about Steps S51 to S54 is not repeated because those steps have been explained with reference to FIG. 5.

The transmission/reception control unit 70 determines whether a server-module request has been received via the wireless I/F unit 85 from the image processing apparatus. The server-module request is a signal to request the server module (Step S54a). If the server-module request has been received (Yes at Step S54a), the transmission/reception control unit 70 wirelessly transmits the server module, the install module, and the uninstall module via the wireless I/F unit 85 to the image processing apparatus from which the server-module request has been received (Step S54b). On the other hand, if the server-module request has not been received (No at Step S54a), Steps S72 to S74 are performed. The explanation about Steps S72 to S74 is not repeated because those steps have been explained with reference to FIG. 25.

If the image forming apparatus is not wirelessly connected to image processing apparatus (No at Step S74), the transmission/reception control unit 70 determines whether the detection signal has been received from another image processing apparatus via the wireless I/F unit 85 (Step S76). If the detection signal has been received from another image processing apparatus (Yes at Step S76), Step S52 and the succeeding steps are repeated. If the detection signal has not been received from another image processing apparatus (No at Step S76), the process control goes to end.

The image processing apparatus receives the server module, the install module, and the uninstall module from the image forming apparatus by executing the control program stored in the storage unit 45 in Steps S1 to S11, S43, S43d to S43g. After that, the image processing apparatus performs Step S43h by executing the install module, Steps S44 to S48 and S48a to S48c by executing the server module, and Step S49 by executing the uninstall module.

Steps corresponding to those shown in FIGS. 4, 23, and 25 are denoted with the same reference numerals. The explanation about Steps S1 to S11, Steps S43 and S44 to S48, and Steps S48a to S48c and S49 is not repeated because Steps S1 to S11, Steps S43 and S44 to S48, and Steps S48a to S48c and S49 have been explained with reference to FIG. 4, FIG. 23, and FIG. 25, respectively. Steps S1 to S11 are not shown in FIG. 26.

After the driver module for the image forming apparatus is installed in the image processing apparatus, the first transmission/reception control unit 16 wirelessly connect the image processing apparatus to the network NW via the network I/F (Step S43). The image processing apparatuses selects the image processing apparatus that works as the print server through data transactions (Step S43d). The first transmission/reception control unit 16 determines whether the image processing apparatus of itself is selected as the print server (Step S43e).

If the image processing apparatus of itself is not selected as the print server (No at Step S43e), the image processing apparatus transmits print data to the image processing apparatus selected as the print server as required, and disconnects from the network with regardless of the other image processing apparatuses. The successive steps following No at Step S43e are not shown in FIG. 26.

If the image processing apparatus of itself is selected as the print server (Yes at Step S43e), the second transmission/reception control unit 18 transmits the server-module request to the image forming apparatus via the wireless I/F unit 40A (Step S43f).

After that, the image processing apparatus wirelessly receives the server module, the install module, and the uninstall module from the image forming apparatus (Step S43g), and installs the received server module therein (Step S43h). The image processing apparatus then performs Steps S44 to S48 that are described with reference to FIG. 23, and Steps S48a to S48c and S49 that are described with reference to FIG. 25. To switch the print server at Step S48a, the image processing apparatuses on the network NW selects the image processing apparatus working as the new print server through the data transactions from among themselves. The newly-selected image processing apparatus is ready to work as the print server in Step S43b to S43e.

In this manner, the user can select the image processing apparatus working as the print server from among the image processing apparatuses, which provides the highly usable information processing system.

Although it is preferable to use a movable device as the image processing apparatus, a fixed image processing apparatus can be used. Moreover, an MFP having the FAX function and the copy function in addition to the printer function can be used as the image forming apparatus.

Figure 27:
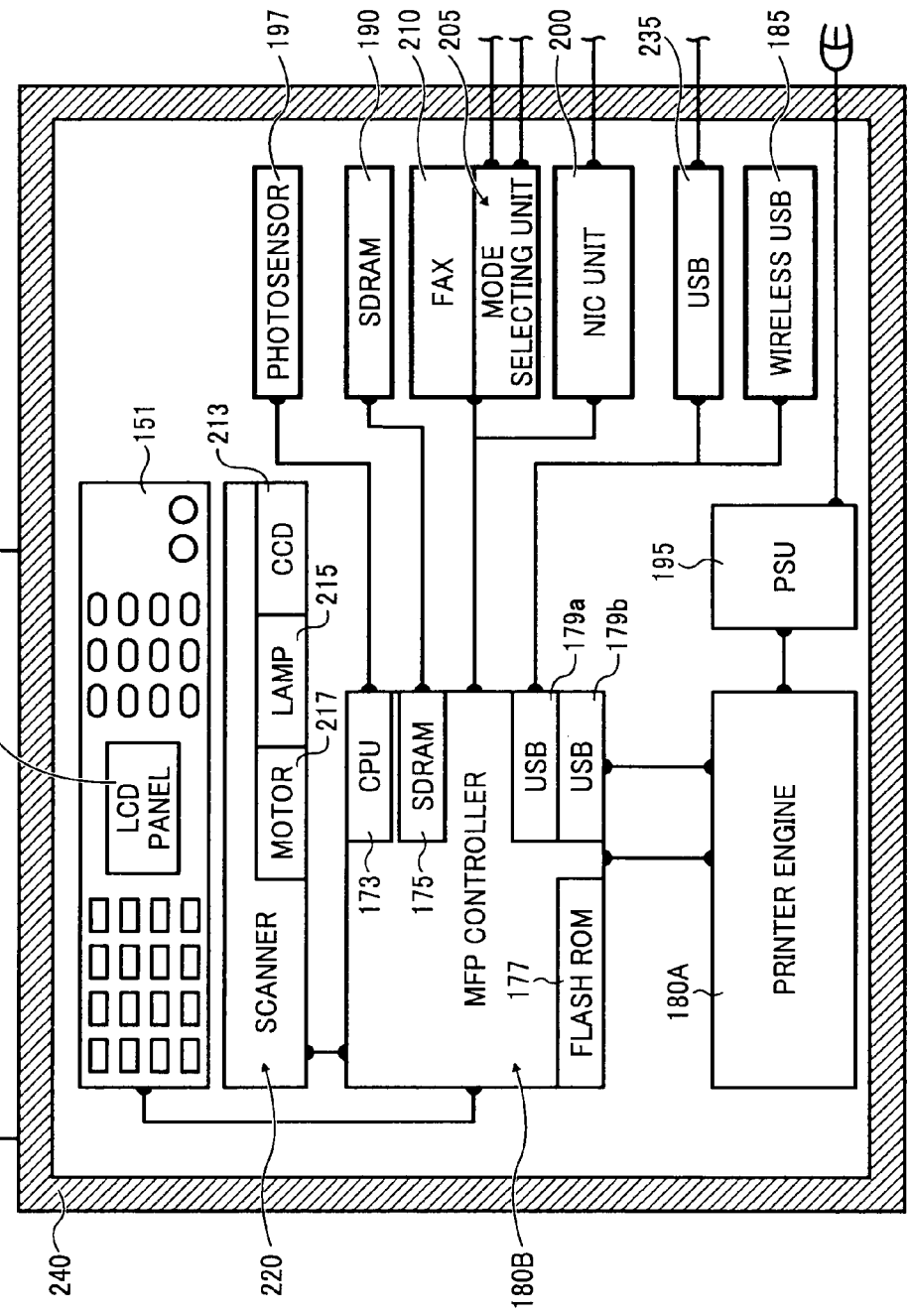
FIG. 27 is a schematic diagram of an MFP working as any one of the image forming apparatuses according to the first embodiment to the ninth embodiment.

FIG. 27 is a schematic diagram of an MFP working as any one of the image forming apparatuses according to the first embodiment to the ninth embodiment (hereinafter, "image forming apparatus 250"). The image forming apparatus 250 includes an operation panel unit 151 as the input unit, a liquid crystal display (LCD) panel 153 as the display unit, a printer engine 180A and an MFP controller 180B that work together as the main control unit, a wireless USB I/F unit 185 as the wireless I/F unit, a synchronous dynamic random access memory (SDRAM) 190 as the storage unit, a power supply unit (PSU) 195 as the power supply circuit, and a photosensor 197. The image forming apparatus 250 further includes a network I/F card (NIC) unit 200 as the network I/F unit, a FAX transmitting/receiving unit 210, a scanner unit 220 that scans an image from an original, an automatic reversing document feeder (ARDF) 230 that conveys the original onto the scanner unit 220, and a USB connector 235.

The MFP controller 180B includes a central processing unit (CPU) 173, an SDRAM 175, a flash read only memory (flash ROM) 177, and USB connectors 179a and 179b. The FAX transmitting/receiving unit 210 includes a mode selecting unit 205 that switches a transmitting/receiving mode between the normal mode and the non-compressed (NC) mode. The scanner unit 220 includes a change coupled device (CCD) image sensor 213, a light source (i.e., lamp) 215, and a motor 217 that is used to move the CCD image sensor 213. The ARDF 230 includes a motor 225 that is used to convey the original in a predetermined direction.

The operation panel unit 151, the LCD panel 153, the ARDF 230 are located on an upper surface of a casing 240 of the image forming apparatus 250; the components other than those units are inside the casing 240. The paper feed unit, the conveyer unit, and the printing unit are not shown in FIG. 27. Some units such as the transmission-speed calculating unit 87 are included in the MFP controller 180B.

The information processing system according to the above embodiments can include the image forming apparatus 250 as the image forming apparatus.

A part of or an entire of the computer program that causes the image forming apparatus to implement a predetermined process of wirelessly transmitting the driver module, the install module, the uninstall module, or the server module from the image forming apparatus to the image processing apparatus can be pre-stored in the storage unit of the image forming apparatus by the manufacture of the image forming apparatus. Alternatively a part of or an entire of the computer program can be stored in a recording medium readable by a computer such as a CD-ROM, and is provided as an accessory of the image forming apparatus. If the computer program is stored in a recording medium and provided as an accessory of the image forming apparatus, the user can decide whether building the information processing system according to the above embodiments. If the user decides to build the information processing system, the user can easily build the information processing system by reading the computer program from the recording medium and installing the computer program in the image forming apparatus.

The computer program according to any one of the above embodiments can define either one of or both of the step of building the wireless connection and the following step of transmitting those modules from the image forming apparatus to the image processing apparatus. The recording medium stored therein the computer program readable by the computer can be any removable medium.

According to an aspect of the present invention, it is possible to suppress a power consumption of an image forming apparatus.

Moreover, even an image processing apparatus that cannot build a wireless connection between the image forming apparatus and itself can use the image forming apparatus as an output device.

Furthermore, it is unnecessary to re-transmit, if a print server is switched from a first image processing apparatus to a second image processing apparatus, print data to the second image processing apparatus.

Moreover, a user can select an image processing apparatus working as the print server.

Furthermore, it is possible to build an information processing system with easy operations.

Moreover, the user can decide whether the information processing system is to be built.

According to the method used in an information processing system according to the present invention including at least one image processing apparatus and at least one image forming apparatus that receives print data from the image processing apparatus and prints an image corresponding to the print data, which are wirelessly connected to each other directly without a network, the image processing apparatus receives a driver module from the image forming apparatus, and performs an installation process of the driver module.

Furthermore, in the method used in the information processing system according to the present invention, the image forming apparatus wirelessly transmits an uninstall module for uninstalling the driver module to the image processing apparatus.

Moreover, in the method used in the information processing system according to the present invention, the image forming apparatus is kept in a power save mode and switched from the power save mode to a normal mode when a wireless connection is established with the image processing apparatus.

Furthermore, in the method used in the information processing system according to the present invention, the image forming apparatus transmits a server module for issuing a function as a print server to the image processing apparatus.

Moreover, in the method used in the information processing system according to the present invention, a plurality of image processing apparatuses is provided including a first image processing apparatus to which the function as the print server has been issued and a second image processing apparatus connected to the first image processing apparatus via a network, and when the image forming apparatus is disconnected from the first image processing apparatus, the image forming apparatus wirelessly transmits the server module and a command to receive untransmitted print data from the first image processing apparatus via the network to the second image processing apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system in which an image processing apparatus including a first wireless interface unit is wirelessly connected to an image forming apparatus including a second wireless interface unit in a direct manner, the image processing apparatus wirelessly transmits print data to the image forming apparatus, and the image forming apparatus prints an image corresponding to the print data, wherein
the image forming apparatus further includes a first transmission/reception control unit that causes the second wireless interface unit to transmit a driver module for the image forming apparatus to the image processing apparatus,
the image processing apparatus further includes an input unit that inputs a command, a second transmission/reception control unit that causes the first wireless interface unit to receive the driver module from the image forming apparatus, and a program processing unit that performs an installation process of the driver module received by the first wireless interface unit,
the first transmission/reception control unit causes the second wireless interface unit to wirelessly transmit a server module for issuing a function as a print server to the image processing apparatus,
the second transmission/reception control unit causes the first wireless interface unit to receive the server module from the image forming apparatus,
the program processing unit performs an installation process of the server module received by the first wireless interface unit,
a plurality of image processing apparatuses is provided including a first image processing apparatus to which the function as the print server has been issued and a second image processing apparatus connected to the first image processing apparatus via a network, and
when the image forming apparatus is disconnected from the first image processing apparatus, the first transmission/reception control unit causes the second wireless interface unit to wirelessly transmit the server module and a command to receive untransmitted print data from the first image processing apparatus via the network to the second image processing apparatus.

2. The information processing system according to claim 1, wherein
the first transmission/reception control unit causes the second wireless interface unit to transmit an uninstall module for uninstalling the driver module to the image processing apparatus,
the second transmission/reception control unit causes the first wireless interface unit to receive the uninstall module from the image forming apparatus, and
the program processing unit performs an uninstall process of the driver module following the uninstall module at a predetermined time after the first wireless interface unit received the uninstall module.

3. The information processing system according to claim 1, wherein when the image processing apparatus simultaneously detects a plurality of image forming apparatuses that are wirelessly connectable via the first wireless interface unit in a direct manner, the second transmission/reception control unit automatically selects at least one image forming apparatus from among the image forming apparatuses, and establishes a wireless connection of a selected image forming apparatus to the first wireless interface unit.

4. The information processing system according to claim 1, wherein
the image processing apparatus further includes a display unit that displays thereon information, and
when the image processing apparatus simultaneously detects a plurality of image forming apparatuses that are wirelessly connectable via the first wireless interface unit in a direct manner, the second transmission/reception control unit acquires device information from each of the image forming apparatuses, displays the device information on the display unit, and when the input unit receives a command to specify at least one image forming apparatus from among the image forming apparatuses, establishes a wireless connection of a specified image forming apparatus to the first wireless interface unit.

5. The information processing system according to claim 1, wherein
the image forming apparatus further includes a power-supply control unit that keeps the image forming apparatus in a power save mode and switches from the power save mode to a normal mode when the first transmission/reception control unit detects the image processing apparatus.

6. The information processing system according to claim 1, wherein
a plurality of image processing apparatuses is provided connected to each other via a network,
an image processing apparatus that works as the print server is determined from among the image processing apparatuses through data transactions between the image processing apparatuses via the network.

7. A non-transitory computer program product comprising a computer-usable medium having computer-readable program codes embodied in the medium for controlling an operation of an image forming apparatus that is wirelessly connected to an image processing apparatus including a display unit in a direct manner, the program codes when executed causing a computer to execute first transmitting including the image forming apparatus wirelessly transmitting a driver module for the image forming apparatus to the image processing apparatus
wherein:
wherein the program codes further causes the computer to execute second transmitting including the image forming apparatus transmitting a server module for issuing a function as a print server to the image processing apparatus,
a plurality of image processing apparatuses is provided including a first image processing apparatus to which the function as the print server has been issued and a second image processing apparatus connected to the first image processing apparatus via a network, and
when the image forming apparatus is disconnected from the first image processing apparatus, the program codes further causes the computer to execute second transmitting including the image forming apparatus wirelessly transmitting the server module and a command to receive untransmitted print data from the first image processing apparatus via the network to the second image processing apparatus.

8. The non-transitory computer program product according to claim 7, wherein the program codes further causes the computer to execute second transmitting including the image forming apparatus wirelessly transmitting an uninstall module for uninstalling the driver module to the image processing apparatus.

9. The non-transitory computer program product according to claim 7, wherein the program codes further causes the computer to execute keeping the image forming apparatus in a power save mode and switching from the power save mode to a normal mode when a wireless connection is established with the image processing apparatus.

* * * * *